United States Patent
Loevsky et al.

(10) Patent No.: US 11,663,937 B2
(45) Date of Patent: May 30, 2023

(54) PUPIL TRACKING IN AN IMAGE DISPLAY SYSTEM

(71) Applicant: Real View Imaging Ltd., Yokneam (IL)

(72) Inventors: Barry Loevsky, Yokneam Ilit (IL); Shlomo Alon-Braitbart, Haifa (IL); Shaul Alexander Gelman, Raanana (IL); Carmel Rotschild, Ganei-Tikva (IL)

(73) Assignee: Real View Imaging Ltd., Yokneam (IL)

( * ) Notice: Subject to any disclaimer, the term of this patent is extended or adjusted under 35 U.S.C. 154(b) by 0 days.

(21) Appl. No.: 16/487,867

(22) PCT Filed: Feb. 19, 2018

(86) PCT No.: PCT/IL2018/050186
§ 371 (c)(1),
(2) Date: Aug. 22, 2019

(87) PCT Pub. No.: WO2018/154564
PCT Pub. Date: Aug. 30, 2018

(65) Prior Publication Data
US 2020/0184865 A1 Jun. 11, 2020

Related U.S. Application Data

(63) Continuation-in-part of application No. PCT/IL2017/050226, filed on Feb. 22, 2017.
(Continued)

(30) Foreign Application Priority Data

Feb. 22, 2017 (WO) .................. PCT/IL2017/050226

(51) Int. Cl.
*G02B 27/01* (2006.01)
*G09G 3/00* (2006.01)

(52) U.S. Cl.
CPC ......... *G09G 3/001* (2013.01); *G02B 27/0172* (2013.01); *G02B 27/0179* (2013.01);
(Continued)

(58) Field of Classification Search
None
See application file for complete search history.

(56) References Cited

U.S. PATENT DOCUMENTS

| 3,800,298 A | 3/1974 | Ogura et al. |
| 4,978,952 A | 12/1990 | Irwin |

(Continued)

FOREIGN PATENT DOCUMENTS

| GB | 2472773 | 3/2011 |
| GB | 2507462 | 5/2014 |

(Continued)

OTHER PUBLICATIONS

Communication Pursuant to Article 94(3) EPC dated Mar. 27, 2020 From the European Patent Office Re. Application No. 17714566.1. (5 Pages).
(Continued)

*Primary Examiner* — Kyle Zhai

(57) ABSTRACT

A pupil tracking system including a light source for illuminating a viewer's eye, an aperture located to pass light from the light source after retro-reflection from the viewer's pupil, the aperture sized and shaped to pass the light from the light source and block at least a portion of other light arriving at the aperture, and a light sensor for tracking a location of a spot produced by the light from the light source which passed the aperture. Related apparatus and methods are also described.

26 Claims, 10 Drawing Sheets

Related U.S. Application Data

(60) Provisional application No. 62/559,575, filed on Sep. 17, 2017, provisional application No. 62/410,494, filed on Oct. 20, 2016, provisional application No. 62/298,036, filed on Feb. 22, 2016, provisional application No. 62/298,070, filed on Feb. 22, 2016.

(52) U.S. Cl.
CPC ........... *G02B 2027/0174* (2013.01); *G02B 2027/0187* (2013.01); *G09G 2354/00* (2013.01)

(56) References Cited

U.S. PATENT DOCUMENTS

| | | | |
|---|---|---|---|
| 5,334,991 A | 8/1994 | Wells et al. | |
| 5,369,511 A | 11/1994 | Amos | |
| 5,673,146 A | 9/1997 | Kelly | |
| 5,844,709 A | 12/1998 | Rabinovich et al. | |
| 5,883,743 A | 3/1999 | Sloan | |
| 6,101,007 A | 8/2000 | Yamasaki et al. | |
| 6,876,878 B2 | 4/2005 | Zhdanov | |
| 6,906,836 B2 | 6/2005 | Parker et al. | |
| 7,259,898 B2 | 8/2007 | Khazova et al. | |
| 7,522,344 B1 | 4/2009 | Curatu et al. | |
| 7,639,208 B1 | 12/2009 | Ha et al. | |
| 7,675,684 B1 | 3/2010 | Weissman et al. | |
| 8,159,733 B2 | 4/2012 | Christmas et al. | |
| 8,213,064 B2 | 7/2012 | Yona et al. | |
| 8,243,133 B1* | 8/2012 | Northcott | G06V 40/19 348/78 |
| 8,500,284 B2 | 8/2013 | Rotschild et al. | |
| 8,570,656 B1* | 10/2013 | Weissman | G02B 27/0172 359/631 |
| 8,576,276 B2 | 11/2013 | Bar-Zeev et al. | |
| 8,976,170 B2 | 3/2015 | Lee et al. | |
| 8,982,471 B1 | 3/2015 | Starner et al. | |
| 9,164,588 B1 | 10/2015 | Johnson et al. | |
| 9,223,152 B1 | 12/2015 | Kress et al. | |
| 9,225,969 B2 | 12/2015 | Aguirre-Valencia | |
| 10,656,720 B1 | 5/2020 | Holz | |
| 2003/0197933 A1 | 10/2003 | Sudo et al. | |
| 2004/0047013 A1* | 3/2004 | Cai | G03H 1/00 359/15 |
| 2004/0066547 A1 | 4/2004 | Parker et al. | |
| 2004/0150888 A1 | 8/2004 | Domjan et al. | |
| 2004/0174605 A1 | 9/2004 | Olsson | |
| 2005/0013005 A1 | 1/2005 | Rogers | |
| 2006/0176242 A1 | 8/2006 | Jaramaz et al. | |
| 2007/0177275 A1 | 8/2007 | McGuire, Jr. | |
| 2007/0258624 A1* | 11/2007 | Mochida | G03F 7/70633 382/106 |
| 2007/0273798 A1 | 11/2007 | Silverstein et al. | |
| 2008/0013793 A1 | 1/2008 | Hillis et al. | |
| 2008/0174659 A1 | 7/2008 | McDowall | |
| 2009/0002787 A1 | 1/2009 | Cable et al. | |
| 2009/0164930 A1 | 6/2009 | Chen et al. | |
| 2009/0237759 A1 | 9/2009 | Maschke | |
| 2009/0238060 A1 | 9/2009 | Yasuda et al. | |
| 2010/0067077 A1 | 3/2010 | Kroll et al. | |
| 2010/0110368 A1 | 5/2010 | Chaum | |
| 2010/0110386 A1* | 5/2010 | Handschy | G03B 21/2033 353/20 |
| 2010/0133424 A1 | 6/2010 | Lindsay | |
| 2010/0238270 A1 | 9/2010 | Bjelkhagen et al. | |
| 2011/0128555 A1 | 6/2011 | Rotschild et al. | |
| 2011/0157667 A1 | 6/2011 | Lacoste et al. | |
| 2012/0052946 A1 | 3/2012 | Yun | |
| 2012/0068913 A1 | 3/2012 | Bar-Zeev et al. | |
| 2012/0139817 A1 | 6/2012 | Freeman | |
| 2012/0140038 A1 | 6/2012 | Bi et al. | |
| 2012/0188619 A1 | 7/2012 | Song et al. | |
| 2012/0224062 A1 | 9/2012 | Lacoste et al. | |
| 2013/0016413 A1 | 1/2013 | Saeedi et al. | |
| 2013/0137076 A1 | 5/2013 | Perez et al. | |
| 2013/0222384 A1 | 8/2013 | Futterer | |
| 2013/0265622 A1 | 10/2013 | Christmas et al. | |
| 2013/0300728 A1 | 11/2013 | Reichow et al. | |
| 2013/0326364 A1 | 12/2013 | Latta et al. | |
| 2014/0002367 A1 | 1/2014 | Glückstad et al. | |
| 2014/0033052 A1 | 1/2014 | Kaufman et al. | |
| 2014/0146394 A1 | 5/2014 | Tout et al. | |
| 2014/0160543 A1 | 6/2014 | Putilin et al. | |
| 2014/0372944 A1 | 12/2014 | Mulcahy et al. | |
| 2015/0016777 A1 | 1/2015 | Abovitz et al. | |
| 2015/0153572 A1 | 6/2015 | Miao et al. | |
| 2015/0168914 A1 | 6/2015 | Gelman et al. | |
| 2015/0206350 A1 | 7/2015 | Gardes et al. | |
| 2015/0234095 A1 | 8/2015 | Schowengerdt | |
| 2015/0250450 A1 | 9/2015 | Thomas et al. | |
| 2015/0332508 A1 | 11/2015 | Jovanovic | |
| 2015/0378080 A1 | 12/2015 | Georgiou et al. | |
| 2016/0018639 A1* | 1/2016 | Spitzer | G02B 5/3083 345/156 |
| 2016/0026253 A1 | 1/2016 | Bradski et al. | |
| 2016/0033771 A1* | 2/2016 | Tremblay | G02B 26/10 345/8 |
| 2016/0077344 A1 | 3/2016 | Burns | |
| 2016/0143528 A1 | 5/2016 | Wilf et al. | |
| 2016/0147308 A1 | 5/2016 | Gelman et al. | |
| 2016/0216515 A1 | 7/2016 | Bouchier et al. | |
| 2016/0223986 A1 | 8/2016 | Archambeau et al. | |
| 2016/0260441 A1 | 9/2016 | Muehlhausen et al. | |
| 2016/0343164 A1 | 11/2016 | Urbach et al. | |
| 2016/0360187 A1 | 12/2016 | Smithwick et al. | |
| 2016/0366399 A1 | 12/2016 | Tempel et al. | |
| 2016/0379606 A1 | 12/2016 | Kollin et al. | |
| 2017/0052373 A1 | 2/2017 | Memmott et al. | |
| 2017/0078651 A1 | 3/2017 | Russell | |
| 2017/0078652 A1 | 3/2017 | Hua et al. | |
| 2017/0123204 A1* | 5/2017 | Sung | G02B 27/0103 |
| 2018/0267323 A1* | 9/2018 | Tsurumi | G02B 27/0179 |
| 2019/0004478 A1 | 1/2019 | Gelman et al. | |
| 2019/0049899 A1 | 2/2019 | Gelman et al. | |
| 2019/0056693 A1 | 2/2019 | Gelman et al. | |
| 2019/0155033 A1 | 5/2019 | Gelman et al. | |
| 2020/0003969 A1 | 1/2020 | Yamashita et al. | |
| 2020/0201038 A1 | 6/2020 | Gelman et al. | |
| 2020/0409306 A1 | 12/2020 | Gelman et al. | |

FOREIGN PATENT DOCUMENTS

| | | |
|---|---|---|
| WO | WO 2005/045531 | 5/2005 |
| WO | WO 2006/008734 | 1/2006 |
| WO | WO 2009/126264 | 10/2009 |
| WO | WO 2009/156752 | 12/2009 |
| WO | WO 2011/018655 | 2/2011 |
| WO | WO 2012/062681 | 5/2012 |
| WO | WO 2012/166593 | 12/2012 |
| WO | WO 2013/112705 | 8/2013 |
| WO | WO 2013/163347 | 10/2013 |
| WO | WO 2014/106823 | 7/2014 |
| WO | WO 2014/155288 | 10/2014 |
| WO | WO 2014/186620 | 11/2014 |
| WO | WO 2015/004670 | 1/2015 |
| WO | WO 2015/164402 | 10/2015 |
| WO | WO 2016/010289 | 1/2016 |
| WO | WO 2016/105281 | 6/2016 |
| WO | WO 2016/105282 | 6/2016 |
| WO | WO 2016/105285 | 6/2016 |
| WO | WO 2016/144459 | 9/2016 |
| WO | WO 2016/156614 | 10/2016 |
| WO | WO 2007/145156 | 8/2017 |
| WO | WO 2017/145154 | 8/2017 |
| WO | WO 2017/145155 | 8/2017 |
| WO | WO 2017/145156 | 8/2017 |
| WO | WO 2017/145158 | 8/2017 |

(56) References Cited

FOREIGN PATENT DOCUMENTS

| WO | WO 2018/154564 | 8/2018 |
|----|----------------|--------|
| WO | WO 2018/211494 | 11/2018 |

OTHER PUBLICATIONS

Official Action dated Apr. 16, 2020 from the US Patent and Trademark Office Re. U.S. Appl. No. 16/106,249. (39 pages).
Official Action dated Dec. 27, 2019 From the US Patent and Trademark Office Re. U.S. Appl. No. 16/078,638. (32 pages).
Interview Summary dated Oct. 5, 2020 from the US Patent and Trademark Office Re. U.S. Appl. No. 16/078,653. (3 pages).
Official Action dated Nov. 2, 2020 from the US Patent and Trademark Office Re. U.S. Appl. No. 16/078,653. (51 pages).
Communication Pursuant to Article 94(3) EPC dated Apr. 28, 2020 From the European Patent Office Re. Application No. 17712554.9. (5 Pages).
Restriction Official Action dated May 18, 2020 from the US Patent and Trademark Office Re. U.S. Appl. No. 16/078,653. (8 pages).
Interview Summary dated Mar. 23, 2020 from the US Patent and Trademark Office Re. U.S. Appl. No. 16/078,638. (3 pages).
International Preliminary Report on Patentability dated Nov. 28, 2019 From the International Bureau of WIPO Re. Application No. PCT/IL2018/050509. (16 Pages).
Communication Pursuant to Article 94(3) EPC dated Jul. 19, 2019 From the European Patent Office Re. Application No. 17714566.1. (5 Pages).
Communication Pursuant to Article 94(3) EPC dated Jul. 30, 2019 From the European Patent Office Re. Application No. 17712554.9. (5 Pages).
Communication Relating to the Results of the Partial International Search and Provisional Opinion dated May 8, 2017 From the International Searching Authority Re. Application No. PCT/IL2017/050226. (16 Pages).
Communication Relating to the Results of the Partial International Search and the Provisional Opinion dated May 15, 2017 From the International Searching Authority Re. Application No. PCT/IL2017/050228. (14 Pages).
International Preliminary Report on Patentability dated Sep. 6, 2019 From the International Bureau of WIPO Re. Application No. PCT/IL2018/050186. (11 Pages).
International Preliminary Report on Patentability dated Sep. 7, 2018 From the International Bureau of WIPO Re. Application No. IL2017/050228. (11 Pages).
International Preliminary Report on Patentability dated Sep. 7, 2018 From the International Bureau of WIPO Re. Application No. PCT/IL2017/050225. (10 Pages).
International Preliminary Report on Patentability dated Sep. 7, 2018 From the International Bureau of WIPO Re. Application No. PCT/IL2017/050226. (14 Pages).
International Search Report and the Written Opinion dated May 4, 2017 From the International Searching Authority Re. Application No. PCT/IL2017/050225. (16 Pages).
International Search Report and the Written Opinion dated Sep. 7, 2017 From the International Searching Authority Re. Application No. PCT/IL2017/050226. (21 Pages).
International Search Report and the Written Opinion dated Jul. 9, 2018 From the International Searching Authority Re. Application No. PCT/IL2018/050186. (19 Pages).
International Search Report and the Written Opinion dated Aug. 10, 2017 From the International Searching Authority Re. Application No. IL2017/050228. (17 Pages).
International Search Report and the Written Opinion dated Sep. 25, 2018 From the International Searching Authority Re. Application No. PCT/IL2018/050509. (24 Pages).

International Search Report and the Written Opinion dated Apr. 26, 2017 From the International Searching Authority Re. Application No. PCT/IL2017/050224. (14 Pages).
International Search Report and the Written Opinion dated Jun. 29, 2017 From the International Searching Authority Re. Application No. PCT/IL2017/050226. (20 Pages).
Official Action dated Oct. 28, 2019 From the US Patent and Trademark Office Re. U.S. Appl. No. 16/078,639. (29 Pages).
Bimber "Holographics Combining Holograms With Interactive Computer Graphics", Retrieved From Holographer.org, 32 P., Apr. 2004.
Bimber "HoloGraphics: Combining Holograms With Interactive Computer Graphics", Retrieved From Holographer.org, p. 1-9, Apr. 2004.
Bimber "Merging Graphics and Holograms", Journal of Holography and Speckle , 3(2): 1-7, Dec. 2006.
Bimber et al. "Interacting With Augmented Holograms", Integrated Optoelectronic Devices, 2005: 41-54, Apr. 21, 2005.
Duchowski et al. "Measuring Gaze Depth With An Eye Tracker During Stereoscopic Display", Proceeding of the ACM SIGGRAPH Symposium on Applied Perception in Graphics and Visualization, APGV'11, Toulouse, France, Aug. 27-28, 2011, p. 15-22, Aug. 27, 2011.
Galeotti et al. "In-Situ Visualization of Medical Images Using Holographic Optics", Proceedings of the Augmented Environments for Medical Imaging Including Augmented Reality in Computer-Aided Surgery (AMI ARCS), at Medical Image Computing and Computer-Assisted Intervention (MICCAI), New York City, p. 93-103, Sep. 10, 2008.
Goodman "Computer-Generated Holograms", Introduction to Fourier Optics, 3rd Ed., Chap.9.9: 355-359, 2005.
Jud et al. "Motion Tracking Systems. An Overview of Motion Tracking Methods", Studies on Mechatronics, Swiss Federal Instimte of Technology Zurich, Switzerland, ETH, Chap. 1-5: 1-81, Spring 2011.
Liao et al. "3-D Augmented Reality for MRI-Guided Surgery Using Integral Videography Autostereoscopic Image Overlay", IEEE Transactions on Biomedical Engineering, XP011343257, 57(6): 1476-1486, Jun. 2010.
Moon et al. "Holographic Head-Mounted Display With RGB Light Emitting Diode Light Source", Optics Express, 22(6): 6526-6534, Published Online Mar. 13, 2014.
Nicolau et al. "An Augmented Reality System for Liver Thermal Ablation: Design and Evaluation on Clinical Cases", Medical Image Analysis, 13(3): 494-506, Available Online Feb. 20, 2009.
Nicolau et al. "Augmented Reality in Laparoscopic Surgical Oncology", Surgical Oncology, 20(3): 189-201, Sep. 2011.
Yeh "Optics of Periodic Layered Media: Bragg Reflectors", Optical Waves in Layered Media, Chap.6.3: 128-134, Feb. 2005.
Communication Pursuant to Article 94(3) EPC dated Feb. 8, 2021 From the European Patent Office Re. Application No. 17714566.1. (6 Pages).
Official Action dated Feb. 16, 2021 From the US Patent and Trademark Office Re. U.S. Appl. No. 16/078,653. (22 Pages).
Communication Pursuant to Article 94(3) EPC dated Mar. 25, 2021 From the European Patent Office Re. Application No. 17712554.9. (5 Pages).
Restriction Official Action dated Mar. 4, 2022 From the US Patent and Trademark Office Re. U.S. Appl. No. 16/613,442. (7 Pages).
Official Action dated Feb. 15, 2022 From the US Patent and Trademark Office Re. U.S. Appl. No. 17/015,126. (40 Pages).
Official Action dated Mar. 16, 2022 from US Patent and Trademark Office Re. U.S. Appl. No. 17/023,443. (52 pages).
Official Action dated Jul. 23, 2021 from the US Patent and Trademark Office Re. U.S. Appl. No. 16/078,653. (22 pages).

* cited by examiner

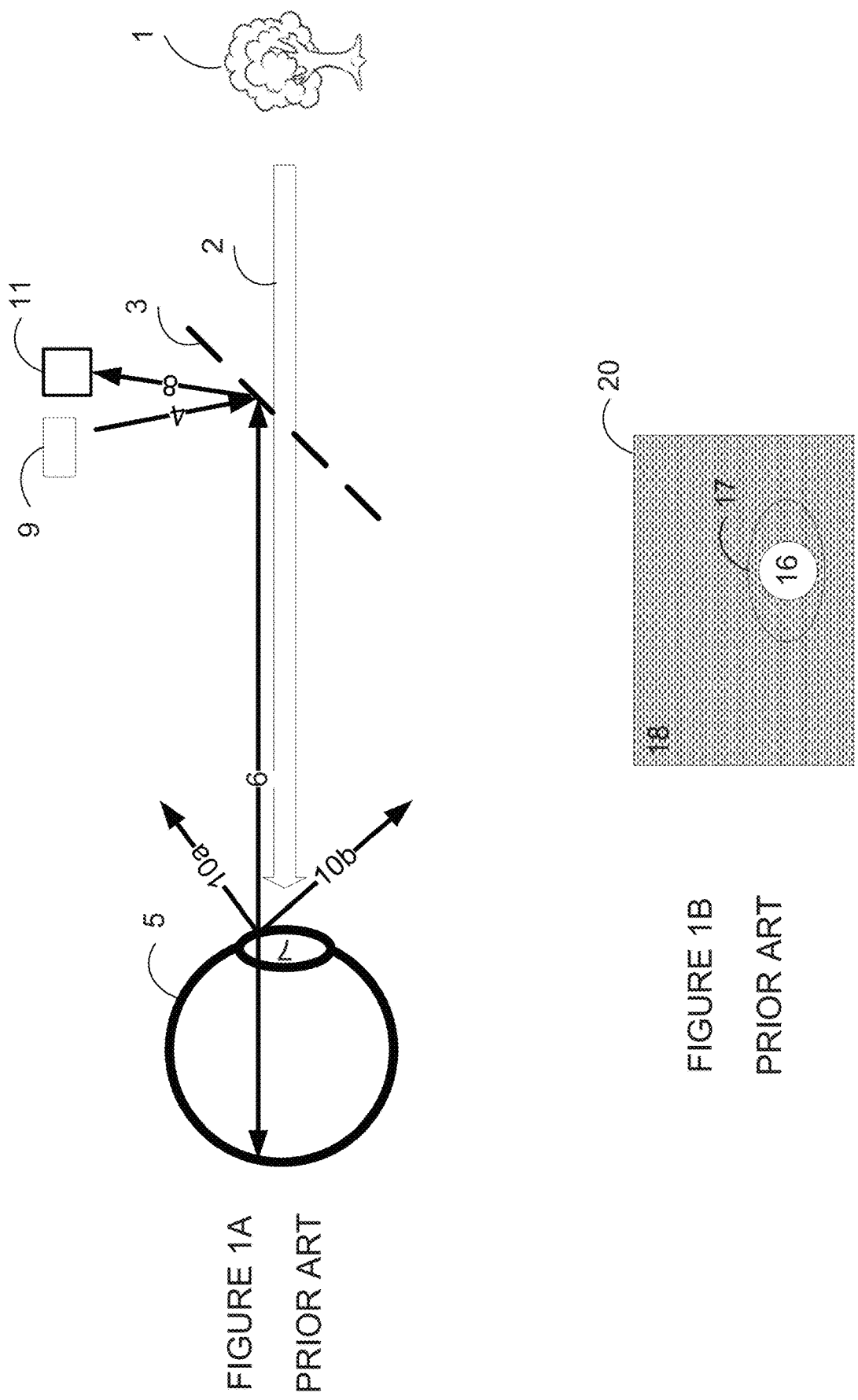

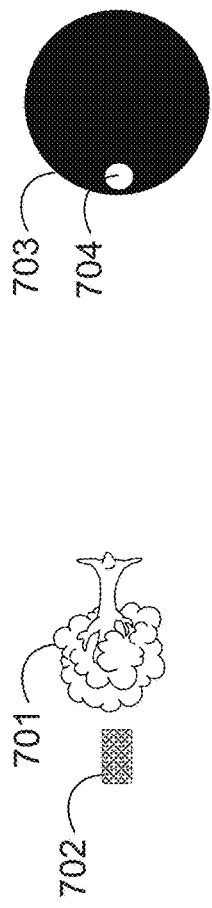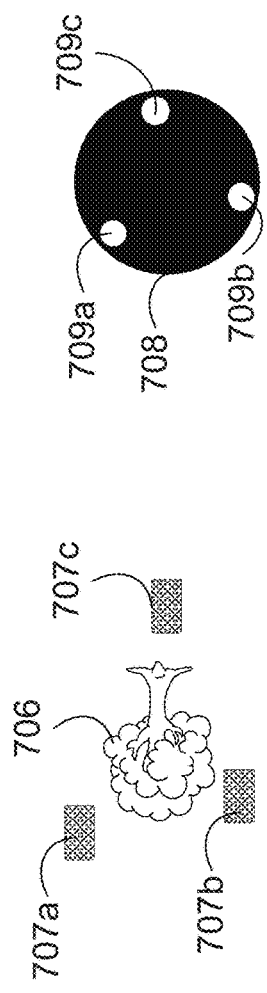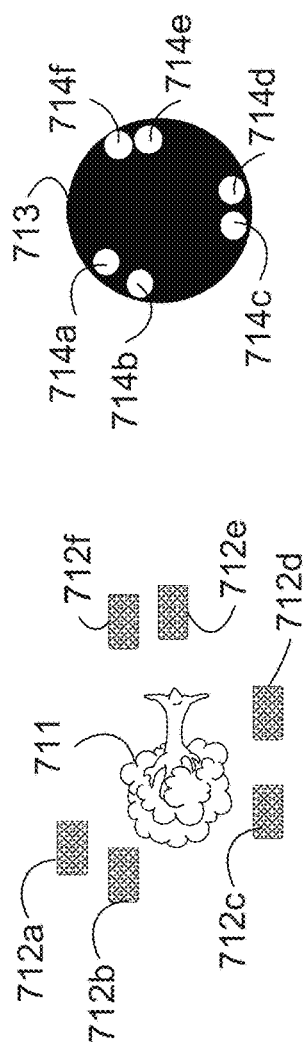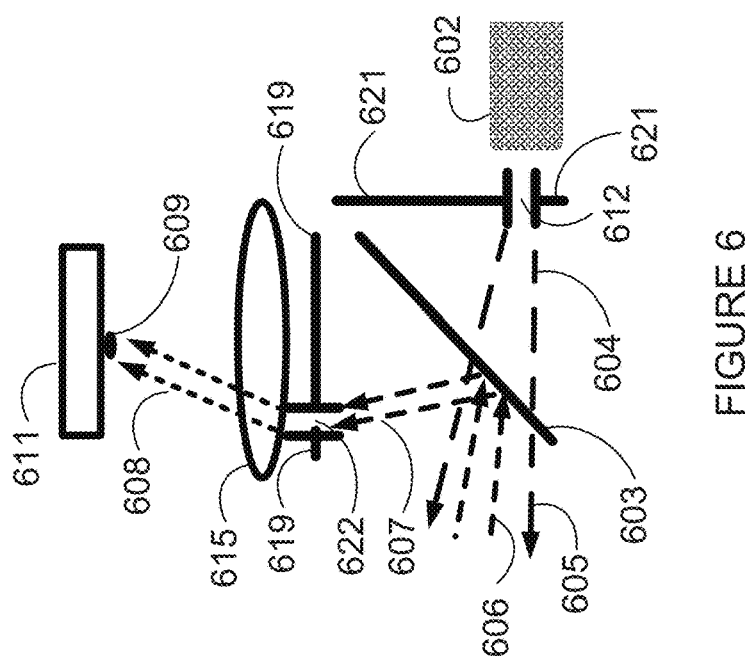

PUPIL TRACKING IN AN IMAGE DISPLAY SYSTEM

RELATED APPLICATIONS

This application is a National Phase of PCT Patent Application No. PCT/IL2018/050186 having International filing date of Feb. 19, 2018, which is a Continuation-in-Part (CIP) of PCT Patent Application No. PCT/IL2017/050226 having International filing date of Feb. 22, 2017, and which also claims the benefit of priority under 35 USC § 119(e) of U.S. Provisional Patent Application No. 62/559,575 filed on Sep. 17, 2017. PCT Patent Application No. PCT/IL2017/050226 claims the benefit of priority under 35 USC § 119(e) of U.S. Provisional Patent Application Nos. 62/410,494 filed on Oct. 20, 2016, 62/298,036 filed on Feb. 22, 2016, and 62/298,070 filed on Feb. 22, 2016. The contents of the above applications are all incorporated by reference as if fully set forth herein in their entirety.

FIELD AND BACKGROUND OF THE INVENTION

The present invention, in some embodiments thereof, relates to a system and method for eye pupil tracking, and, more particularly, but not exclusively, to a system and method for eye pupil tracking in an augmented reality display.

Pupil and/or eye tracking is sometimes used in Head Mounted Displays (HMDs) and other projection systems. In general the eye's pupil acts as a retro-reflector to light passing through the pupil, while area surrounding the pupil has scattering properties. The eye's pupil acting as a retro-reflector means a reflection angle of 180 degrees with respect to an incident angle, reflecting incident light back along a same axis in an opposite direction. Using this difference in reflection properties, conventional methods include dark-eye and bright-eye imaging.

The dark-eye method is conventionally performed in a similar way to dark field illumination, where illumination is projected from outside a Field of View (FoV) of a sensor/camera. Scattered light from the viewer white of the eye or face is scattered to all directions, including inside the FoV of the sensor/camera. Light which passes through the pupil retro-reflects to the direction from which it came, and does not reach the sensor/camera. Therefore, in a dark-eye image the pupil is dark and the surrounding is bright.

The bright-eye method uses on-axis or close-to-axis illumination, where axis refers to an optical axis of the FoV of the sensor/camera. The retro-reflection through the pupil is then brighter than the scattering surrounding of the pupil.

U.S. Pat. No. 7,522,344 teaches methods, systems, apparatus and devices for the lens design of a HMD with eye-tracking capabilities. The integration uses a low-level optical configuration in order to achieve a compact, comfortable, easy-to-use system. The optical system is further designed and optimized for sharing of the optical path between the HMD and the Eye-Tracker with minimal performance loss for both tasks.

Additional background art includes:

An article titled "Measuring Gaze Depth with an Eye Tracker During Stereoscopic Display" by Andrew T. Duchowski, Brandon Pelfrey, Donald H. House, and Rui Wang.

The disclosures of all references mentioned above and throughout the present specification, as well as the disclosures of all references mentioned in those references, are hereby incorporated herein by reference.

SUMMARY OF THE INVENTION

According to an aspect of some example embodiments a viewer's eye is illuminated by an illumination light source, and light reflected from the eye toward a camera or sensor used for pupil tracking passes through a mask which passes light reflected through the viewer's pupil.

According to an aspect of some embodiments of the present invention there is provided a pupil tracking system including a light source for illuminating a viewer's eye, an aperture located to pass light from the light source after retro-reflection from the viewer's pupil, the aperture sized and shaped to pass the light from the light source and block at least a portion of other light arriving at the aperture, and a light sensor for tracking a location of a spot produced by the light from the light source which passed the aperture.

According to some embodiments of the invention, the aperture is placed at a location of an image of the light source.

According to some embodiments of the invention, further including an optical component for imaging the viewer's pupil to an image on a light sensor.

According to some embodiments of the invention, the optical component for imaging the viewer's pupil is placed next to the aperture.

According to some embodiments of the invention, further including a second aperture for passing light emerging from the light source before illuminating the viewer's eye.

According to some embodiments of the invention, the light sensor includes a camera.

According to some embodiments of the invention, further including a computer generated image display system for displaying a computer generated image to the viewer's eye.

According to some embodiments of the invention, the system included in a Head Mounted Display (HMD).

According to some embodiments of the invention, the computer generated image includes a three dimensional (3D) computer generated holographic (CGH) image.

According to some embodiments of the invention, the 3D CGH image includes a 3D CGH image produced by projecting coherent light onto an interference pattern formed on a Spatial Light Modulator (SLM).

According to some embodiments of the invention, an optical path of the light from the light source forms an apparent image, relative to the computer generated image, which does not overlap the computer generated image.

According to some embodiments of the invention, the light source emits Near-Infra-Red (NIR) light.

According to some embodiments of the invention, the light source for illuminating the viewer's eye includes a plurality of light sources for illuminating the viewer's eye.

According to some embodiments of the invention, the aperture located to pass light from the light source after retro-reflection from the viewer's pupil located at an image of the light source includes a plurality of apertures, each one of the plurality of apertures located at a location of an image of a corresponding one of the plurality of light sources.

According to some embodiments of the invention, locations of each one of the plurality of apertures located at a location of an image of a corresponding one of the plurality of light sources is located so as not to receive retro-reflected light from a different one of the plurality of light sources.

According to some embodiments of the invention, at least a first one of the plurality of light sources emits light at a different spectrum than at least a second one of the plurality of light sources.

According to some embodiments of the invention, further including at least one of the first aperture passing light from a first light source and a second aperture passing light from a second light source includes a spectral filter to pass only light from a corresponding one of the first light source and the second light source.

According to some embodiments of the invention, the plurality of light sources are turned on in a time sequential fashion.

According to some embodiments of the invention, apertures corresponding to the plurality of light sources are opened in a time sequential fashion synchronized to a turning on of plurality of light sources.

According to some embodiments of the invention, the light source for illuminating the viewer's eye includes one light source and a plurality of apertures for passing light emerging from the one light source.

According to some embodiments of the invention, the aperture located to pass light from the light source after retro-reflection from the viewer's pupil located at a first image of the light source includes a plurality of apertures, each one of the plurality of apertures located at a location of an image of a corresponding one of the plurality of apertures for passing light emerging from the one light source.

According to some embodiments of the invention, the light source provides plane-polarized light and further including a retro-reflected-light plane-polarizing filter located along an optical path after retro-reflection from the viewer's pupil, polarized at a polarization direction perpendicular to that of a direction of polarization of the plane-polarized light provided by the light source.

According to some embodiments of the invention, further including a light source polarizer for providing the plane-polarized light.

According to an aspect of some embodiments of the present invention there is provided a method for tracking a viewer's pupil including using a light source to illuminate a viewer's pupil, using an aperture in a mask to pass light from the light source retro-reflected through the pupil, using the mask to stop at least some of other light arriving at the mask, and detecting the light passing through the aperture by a light sensor.

According to some embodiments of the invention, the using the light source includes using a Near-Infra-Red (NIR) light source.

According to some embodiments of the invention, the detecting the light passing through the aperture at a light sensor includes imaging the pupil at the light sensor.

According to some embodiments of the invention, further includes imaging the light source at the aperture.

According to some embodiments of the invention, tracking the viewer's pupil includes tracking the viewer's pupil in a Head Mounted Display (HMD).

According to some embodiments of the invention, the HMD includes a HMD for displaying a three dimensional (3D) computer generated holographic (CGH) image.

According to some embodiments of the invention, the 3D CGH image includes a 3D CGH image produced by projecting coherent light onto an interference pattern formed on a Spatial Light Modulator (SLM).

According to some embodiments of the invention, an optical path of the light from the light source forms an apparent image, relative to the 3D CGH image computer generated image, which does not overlap the 3D CGH.

According to some embodiments of the invention, the light source for illuminating the viewer's pupil includes a plurality of light sources for illuminating the viewer's pupil.

According to some embodiments of the invention, the aperture to pass light from the light source includes a plurality of apertures, each one of the plurality of apertures located at a location of an image of a corresponding one of the plurality of light sources.

According to some embodiments of the invention, the using the light source to illuminate a viewer's pupil includes illuminating the viewer's pupil with plane-polarized light, and further including using a retro-reflected-light plane-polarizing filter located along an optical path after retro-reflection through the viewer's pupil, polarized at a polarization direction perpendicular to that of a direction of polarization of the plane-polarized light provided by the light source to filter light after retro-reflection through the viewer's pupil.

According to some embodiments of the invention, further including using a light source polarizer for illuminating the viewer's pupil with plane-polarized light.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1A is a simplified line drawing of a viewer's eye and an example prior art pupil tracking system;

FIG. 1B is a simplified line drawing illustration of an image captured by a camera in the pupil tracking system of FIG. 1A;

FIG. 6 is a simplified line drawing illustration of components for tracking a pupil according to an example embodiment of the invention; and FIGS. 7A-7F are simplified illustrations of locations of images of pupil tracking illumination light sources and simplified illustrations of locations of apertures corresponding to the images of the pupil tracking illumination light according to example embodiments of the invention.

DESCRIPTION OF SPECIFIC EMBODIMENTS OF THE INVENTION

Figure 1C:
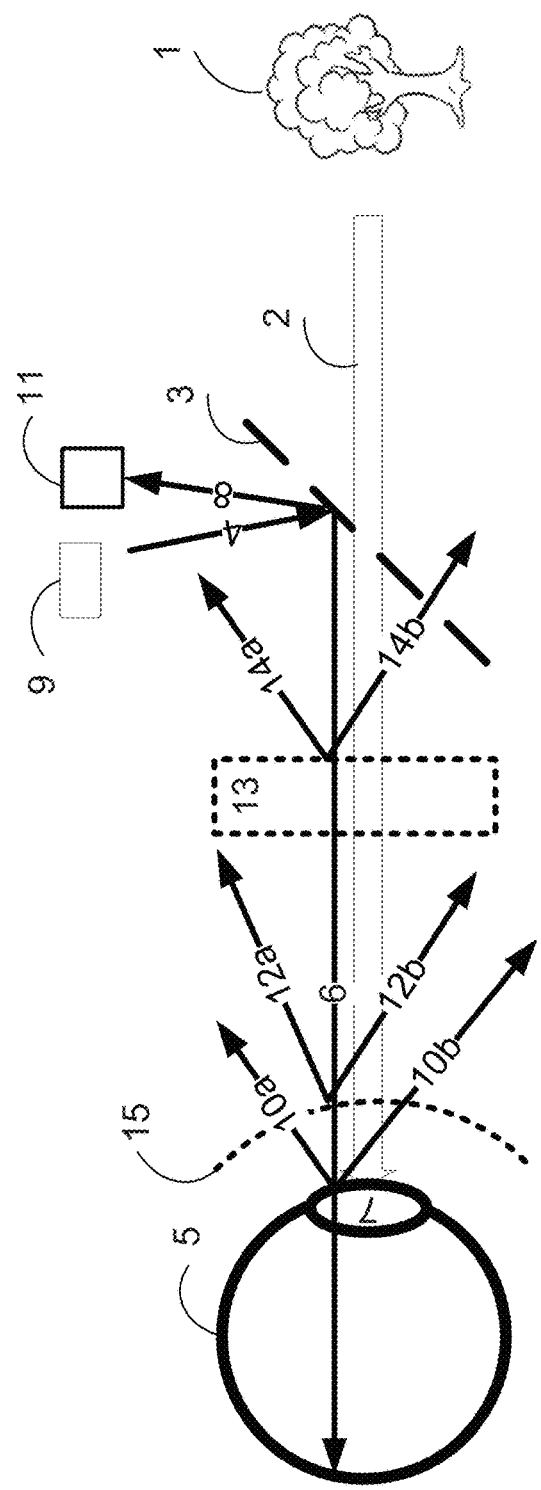
FIG. 1C is a simplified line drawing of a viewer's eye and an example prior art pupil tracking system.

The present invention, in some embodiments thereof, relates to a system and method for eye pupil tracking, and, more particularly, but not exclusively, to a system and method for eye pupil tracking in an augmented reality or a virtual reality display.

Pupil tracking is optionally used in Head Mounted Displays (HMD) and other displays and projection systems where projecting an image includes projecting the image toward a viewer's eye pupil.

When illuminating an eye pupil, the pupil typically acts as a retro-reflector, and surroundings of the pupil typically acts as a material with scattering properties.

The present invention, in some embodiments thereof, aims to present systems and methods for bright-eye based pupil tracking with improved Signal to Noise Ratio (SNR), in some embodiments potentially enabling pupil location by image processing of a single image frame. For example, in some embodiments, reducing or eliminating non-retro-reflection light from a pupil illuminator and/or reducing or eliminating stray light improves SNR of a retro-reflected image of an observer's pupil, potentially eliminating a need for averaging several frames of an image of the eye in order to obtain good contrast of the pupil against its background.

For purposes of better understanding some embodiments of the present invention, reference is first made to FIG. 1A, which is a simplified line drawing of a viewer's eye and an example prior art pupil tracking system.

FIG. 1A shows a display system which generally projects light 2 to form an image 1 at a viewer's eye 5. In the example shown in FIG. 1A, the light 2 is projected to the viewer's eye 5 through a semi-transparent/semi-reflecting mirror 3.

A light source 9 projects light 4 onto the mirror 3, and at least a portion of the light 4 is reflected and projects as light 6 toward the eye 5. The light 6 passes through the eye pupil 7, is reflected as light 6 from the eye's retina, back along substantially an opposite direction, and is reflected by the mirror 3 toward a sensor or camera 11.

In some embodiments, the semi-transparent/semi-reflecting mirror 3 is optionally a chroic reflection optical component, optionally reflecting at a wavelength of the light source 9, in some embodiments a multi-chroic optical component, optionally reflecting also at one or more wavelengths used for producing the image 1.

Light 6 from the mirror 3 which hits an area surrounding the pupil 7, such as a white of the eye 5, is scattered in various directions, for example as light 10a 10b.

Reference is now additionally made to FIG. 1B, which is a simplified line drawing illustration of an image captured by a camera in the pupil tracking system of FIG. 1A.

FIG. 1B shows an image 20 which includes a bright spot 16, which is a bright retina reflection of light from a retina of the viewer's eye 5 of FIG. 1A, on a darker background 17 of the white of the viewer's eye and a darker background 18 of an area surrounding the eye. The backgrounds 17 18 are darker because more of the light reaching the camera for imaging the backgrounds 17 18 was scattered, not reflected.

The sensor/camera 11 of FIG. 1A tracks movement of the pupil 7 by tracking a movement of the bright spot 16 relative to the darker backgrounds 17 18.

Reference is now additionally made to FIG. 1C, which is a simplified line drawing of a viewer's eye and an example prior art pupil tracking system.

FIG. 1C shows a display system like the display system of FIG. 1A, with two additions: one or more optional optical component(s) 13 and optional lens 15, such as an eyeglass lens of the viewer's eye 5. FIG. 1C also show a pupil tracking system like the pupil tracking system in FIG. 1A.

In the pupil tracking system of FIG. 1C, a light source 9 projects light 4 onto the mirror 3, and at least a portion of the light 4 is reflected and projects as light 6 toward the eye 5. The light 6 passes through the eye pupil 7, is reflected as light 6 from the eye's retina, back along substantially an opposite direction, and is reflected by the mirror 3 toward a sensor or camera 11.

As described with reference to FIG. 1A, light 6 from the filter which hits an area surrounding the pupil 7, such as a white of the eye 5, is scattered in various directions, for example as light 10a 10b.

Additionally, part of the light 6 is scattered 14a 14b from the one or more optional optical component(s) 13, reducing an intensity of light remaining to be eventually reflected back onto the camera 11, making the bright spot 16 of the pupil 7 less bright, and producing more scattered light 14a 14b, part of which may end up making the backgrounds 17 18 brighter, thereby reducing the Signal-to-Noise Ratio (SNR) of the pupil tracking image.

In some cases, part of the light 6 is scattered 12a 12b from the optional lens 15, reducing an intensity of light remaining to be eventually reflected back onto the camera 11, making the bright spot 16 of the pupil 7 less bright, and producing more scattered light 12a 12b, part of which may end up making the backgrounds 17 18 brighter, thereby reducing the Signal-to-Noise Ratio (SNR) of the pupil tracking image.

INTRODUCTION

An aspect of some embodiments of the invention includes providing an aperture stop in a pupil tracking system, to enable pupil tracking illumination light, retro-reflected through a viewer's pupil, to pass, and to block most other light.

Such an aperture stop potentially increases a Signal to Noise Ratio, or contrast, of an image of the pupil tracking illumination at a pupil tracking camera, which is used to calculate a position of the viewer's pupil.

In some embodiments, a pupil detector is located at an image plane of an image of the pupil, and a location of the pupil on the pupil detector corresponds to a location of the pupil's image. In some embodiments calculating a location of the pupil includes optionally multiplying by a magnification or a de-magnification factor of the optical system imaging the pupil.

In some embodiments the detector is not necessarily placed at in an image plane of an image of the pupil. In such a case, the pupil location is dependent on a spot of the retro-reflected light from the pupil on the detector, optionally linearly dependent.

In some embodiments, multiple apertures are used, enabling light from multiple pupil illumination sources to reach the pupil tracking camera, potentially increasing SNR for tracking by providing multiple images of the pupil tracking illumination at a pupil tracking camera, each one of which can be used to calculate the position of the viewer's pupil.

In some embodiments, the multiple images of the pupil tracking illumination at a pupil tracking camera are all captured in one image frame.

In some embodiments, the multiple pupil illumination light sources are located in a one-to-one correspondence with the multiple apertures, so that light from each one of the light sources, retro-reflected through the viewer's pupil, passes through a corresponding one of the multiple apertures.

An aspect of some embodiments of the invention includes locating a pupil illumination source within a computer generated image display system so that an image of the pupil illumination source is not formed within a boundary of the displayed computer generated image.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 2A:
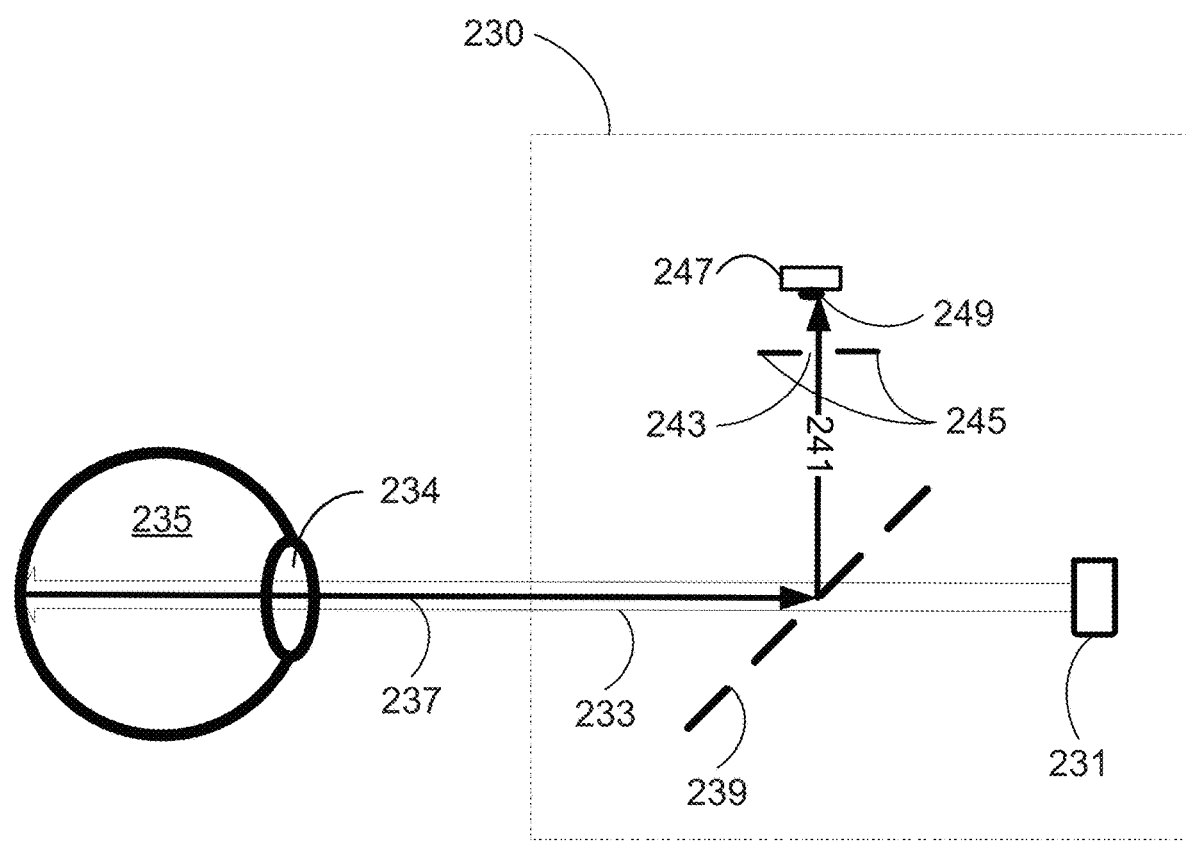
FIG. 2A is a simplified block diagram drawing of a viewer's eye and a pupil tracking system according to an example embodiment of the invention.

Reference is now made to FIG. 2A, which is a simplified block diagram drawing of a viewer's eye and a pupil tracking system according to an example embodiment of the invention.

FIG. 2A shows a pupil tracking system 230.

The pupil tracking system 230 includes:

a light source 231 for illuminating a viewer's eye 235;

an aperture 243 in a mask 245, the aperture 243 located to pass light 241 from the light source 231 after retro-reflection from the viewer's eye 235 through a viewer's pupil 234, the aperture 243 sized and shaped to pass the retro-reflected light 241, and the mask 245 to block at least a portion of other light arriving at the mask 245; and a light sensor 247 for tracking a spot 249 of the retro-reflected light 241 from the light source 231 which passed the aperture 243 and is formed on the light sensor 247.

FIG. 2A shows an example embodiment in which the light source 231 illuminates 233 the eye 235, optionally through a semi-transparent/semi-reflective mirror 239. The illumination 233 passes through a pupil 234 of the eye 235. The illumination which passed through the pupil 234 is retro-reflected back through the pupil 234 as light 237. Light from the illumination 233 which illuminated other portions of the eye 235, such as a white of the eye, is mostly scattered in various directions.

The light 237 is optionally directed to the sensor 247, through the aperture 243.

FIG. 2A shows the light 237 reflecting off the semi-transparent/semi-reflective mirror 239 as light 241, which passes through the aperture 243 in a mask 245.

In some embodiments, optical components in the system 230 form an image of the light source 231 onto the aperture 243, such that light from the light source 231, retro-reflected as light 237 241 from the pupil 234, passes through the aperture 243.

In some embodiments the spot 249 of light 241 is formed at a location on the sensor 247 which corresponds to a location of the pupil 234. When the pupil 234 moves, the spot 249 tracks the movement of the pupil 234.

In some embodiments, optical components in the system 230 focus an image of the viewer's pupil 234 to the spot 249 on the light sensor 247. In some embodiments, when the pupil 234 moves, the spot 249 moves relative to the light sensor 247.

Figure 2B:
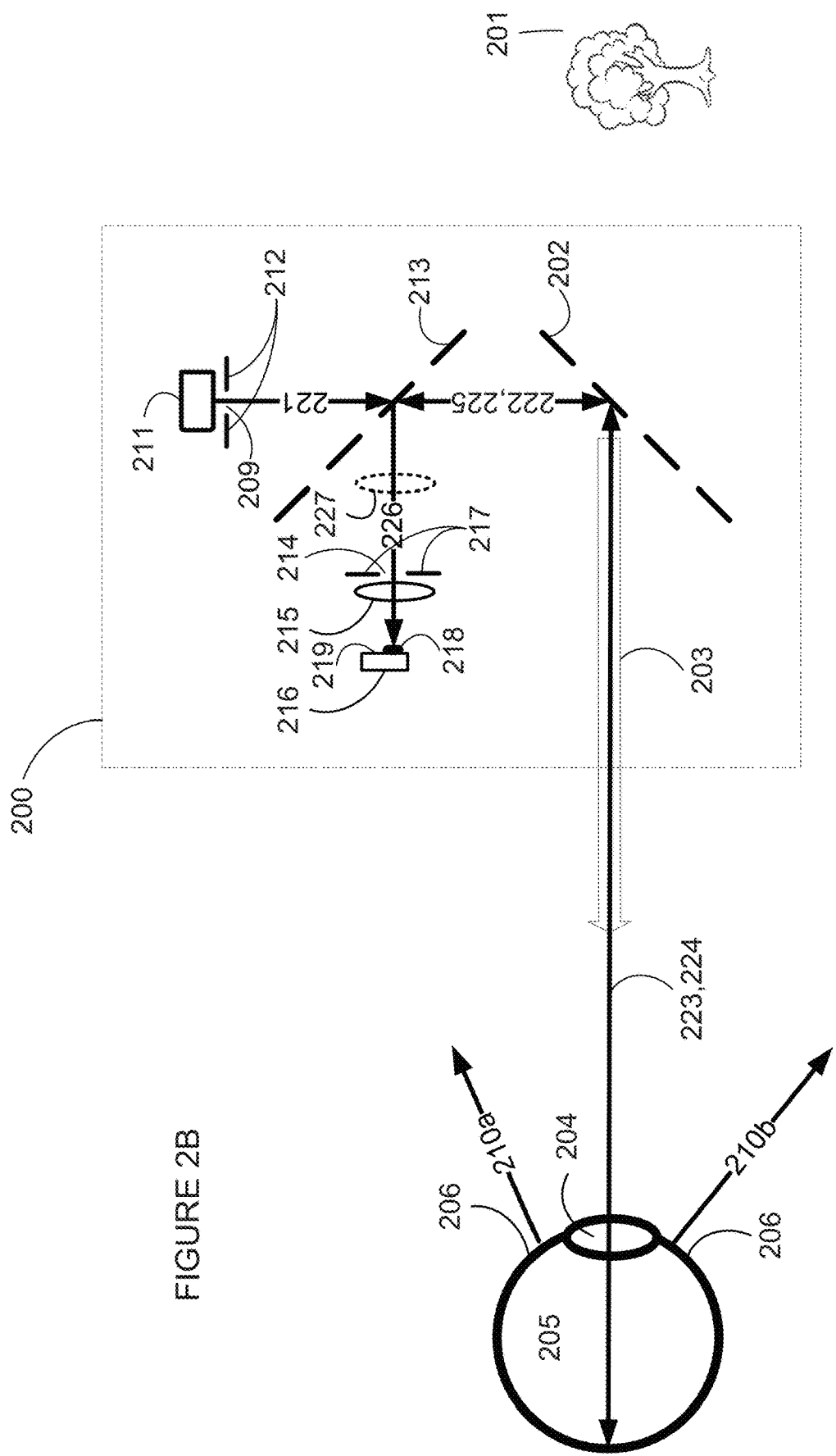
FIG. 2B is a simplified line drawing of a viewer's eye and a pupil tracking system according to an example embodiment of the invention.

Reference is now made to FIG. 2B, which is a simplified line drawing of a viewer's eye and a pupil tracking system according to an example embodiment of the invention.

FIG. 2B shows a display system 200 which generally projects light 203 to form an image 201 for viewing by a viewer's eye 205. Details about the source of the light 203 and forming the image 201 are not shown in FIG. 2B so as not to confuse the image. Such details are provided, for example, with reference to FIGS. 4A-D and 5. In the example shown in FIG. 2B, the light 203 is projected to the viewer's eye 205 via a semi-transparent/semi-reflecting mirror 202. In some embodiments the image 201 is a Computer Generated Holographic (CGH) image. In some embodiments the image 201 is a CGH image produced by projecting coherent light on or through a Spatial Light Modulator (SLM) (not shown in FIG. 2B). In some embodiments the image 201 is a Computer Generated Holographic (CGH) image produced by projecting coherent light on or through an interference pattern in the SLM. In some embodiments the image 201 is a stereoscopic image. In some embodiments the image 201 is a 2D image.

A light source 211 optionally projects light 221 through a semi-transparent/semi-reflecting mirror 213, as light 222 onto an optionally semi-transparent/semi-reflecting mirror 202, and at least a portion of the light 222 is reflected by the semi-transparent/semi-reflecting mirror 202 and projects as light 223 toward the eye 205. The light 223 passes through the eye pupil 204, is retro-reflected as light 224 from the eye's retina, back along substantially an opposite direction, and is reflected by the semi-transparent/semi-reflecting mirror 202 toward the mirror 213 as light 225 toward the mirror 213, and from the mirror 213 toward a sensor or camera 216.

In some embodiments the light source 211 is optionally a Near Infrared (NIR) light source. In some embodiments the light source 211 is optionally a LED light source.

In some embodiments the sensor or camera 216 is optionally a Charge Coupled Device (CCD) camera or a Beam Positioning Sensor (BPS). In some embodiments the sensor or camera 216 is optionally a NIR sensitive sensor or camera.

Light 223 from the mirror 202 which hits an area surrounding the pupil 207, such as a white 206 of the eye 205, is scattered in various directions, for example as light 210a 210b.

However, in some embodiments, an optional additional component—a mask 217 with an aperture 214 is added in the optical path of the light 226 toward the camera 216.

The term "aperture" in all its grammatical forms is used throughout the present specification and claims to mean a hole through which light passes.

The aperture is typically surrounded by a mask which blocks light from passing. The term "mask" in all its grammatical forms is used throughout the present specification and claims to mean a substance which blocks light from passing. In some embodiments the mask optionally includes an aperture through which light does pass.

In some embodiments an optional imaging optical element 227 such as a lens 227 is placed along a path of the retro-reflected light 224 225 226 to form an image of the light source 211, and the aperture 214 is placed at a location of the image of the light source 211, such that light 224 from the light source 211, which has been retro-reflected through the pupil 204, reflected by mirror 202, as light 225 and further reflected by semi-transparent mirror 213 as light 226, passes through the aperture 214. Light passing through the optical system of FIG. 2B in directions different than the retro-reflected light 224, such as the scattered light 210a 210b, will either not reach the mask 217, or mostly be blocked by the mask 217.

The light 224 from the light source 211 which has been retro-reflected through the pupil 204, passes through the aperture 214 because the meaning of retro-reflection is that light reflects back along the same line/direction from which it came, in an opposite direction, and because placing the aperture 214 at a location of an image of the light source 211 means that the retro-reflected light 224 225 226 passes through the aperture 214.

In some embodiments, even when the eye looks to a different direction, light 223 passing through the pupil 204 and retro-reflected as light 224 through the pupil 204 will go back in an opposite direction to the light 223, and on to be imaged at the aperture 214. As long as the light 223 is retro-reflected as light 224, the optical system described in the example embodiment of FIG. 2B images the light source 211 on the aperture 214. The fact that the pupil provides retro-reflection means that the optical system of FIG. 2B can be designed to image the light source 211 on the aperture 214 regardless of a direction of gaze of the eye 205.

However, in some embodiments, an optional additional component—a mask 212 with an aperture 209 is added in the optical path of the light 221 from the light source 211. In some embodiments the aperture 209 is optionally used to reduce an effective size of the light source 211.

In some embodiments the aperture 214 is placed at a location of an image of the aperture 209, such that light from the aperture 209, which has been retro-reflected through the pupil 204, passes through the aperture 214. Light passing through the optical system of FIG. 2B in directions different than the retro-reflected light 224, such as the scattered light 210a 210b, will either not reach the mask 217, or mostly be blocked by the mask 217.

The light 224 from the aperture 209 which has been retro-reflected through the pupil 204, passes through the aperture 214 because the meaning of retro-reflection is that light reflects back along the same line/direction from which it came, in an opposite direction, and because placing the aperture 214 at a location of an image of the aperture 209 means that the retro-reflected light 224 225 226 passes through the aperture 214.

In some embodiments an optional additional component—an optical component such as a lens 215—is added in the optical path of the light 226 toward the camera 216.

In some embodiments the aperture 214 is optionally placed at an aperture stop of the light path of the light source 211. Optionally, the lens 215 images the pupil 204 at a location 218 on the detector, sensor or camera 216. In some embodiments, the aperture 214 and the lens 215 are combined into a single optical element such as a combined lens 215 plus aperture.

In some embodiments, light for producing an image of the bright spot 16 of FIG. 1B passes through the aperture 214, and most of the scattered light for producing an image of the darker portions of the background 17 18 of FIG. 1B is blocked.

In such embodiments the Signal-to-Noise Ratio (SNR), or to use another term, the contrast, of the bright spot 16 of FIG. 1B relative to the darker portions of the background 17 18 of FIG. 1B is much increased. In some embodiments the contrast is increased by a factor in a range of 1.5, 2, 5, 10, 25, 50, to 100 and even more.

In such embodiments a computing burden for tracking the pupil is potentially lessened, by virtue of having a better contrast in the image formed by the camera 216 for tracking the pupil 204.

In some embodiments the optional aperture 209 is optionally placed between the light source 211 and the semi-transparent/semi-reflecting mirror 213. In some embodiments the optional aperture 209 is optionally used to limit a size and/or spread of a light ray bundle coming from the light source 211.

In some embodiments the aperture 214 is at a plane of an aperture stop of the pupil tracking optical components.

The aperture 214 is at a location where retro-reflected light from the light source 211 or from the optional aperture 209 pass through the plane of the mask 217.

In some embodiments a spot of light 218 is formed on a plane of the sensor or camera 216. The spot of light 218 is a retro-reflection of light 224 from a retina of the viewer's eye 205, on a darker background 219 of a white of the viewer's eye 205 and a darker background 219 of an area surrounding the eye 205. The background 219 is darker because most of the light reaching the camera 216 for imaging the background 219 was blocked by the mask 217.

The sensor or camera 216 optionally tracks movement of the pupil 204 by tracking a movement of the bright spot 218 relative to the darker background 219.

In some embodiments the sensor 216 is optionally a quadrant sensor, a CCD sensor, a camera, and/or a Beam Positioning Sensor (BPS).

In some embodiments the sensor 216 is optionally a beam positioning sensor for indicating a location of the bright spot 218.

In some embodiments the sensor 216 is optionally a quadrant sensor.

In some embodiments tracking the pupil 204 includes calculating a center-of-gravity of the spot of light 218.

In some embodiments, the semi-transparent/semi-reflecting mirror 202 is optionally a chroic reflection optical component.

The term chroic reflection optical component is used in the present specification and claims to describe an optical component which reflects a specific wavelength of light, and passes other wavelengths of light.

A non-limiting example of a chroic reflector is a thin-film filter, or interference filter, which is an accurate color filter used to selectively reflect light of a small range of colors while passing other colors.

It is noted that thin-film filters can be stacked to reflect more than one range of colors while passing other colors.

In some embodiments, the semi-transparent/semi-reflecting mirror 202 is optionally a trichroic reflection optical component, optionally reflecting at three wavelengths of the light used for producing the image 201 as a color image.

In some embodiments, by way of some non-limiting example when a viewer is wearing glasses, or when there are many optical components in the display system to scatter light, the better SNR, or contrast, potentially makes it possible to:

track the pupil 204, where a prior art pupil tracking system might not succeed due to a poorer SNR or contrast;

track the pupil 204 more accurately;

track the pupil 204 faster, that is with less of a potential lag;

track the pupil 204 requiring less calculation resources.

In some embodiments, by virtue of improved SNR based on the aperture(s), less expensive components may optionally be used in the optical systems for display and/or for pupil tracking, for example optical components which exhibit more scattering, such as, by way of a non-limiting example, optical components which use less expensive optical coatings, or no optical coatings at all.

In some embodiments the light source 211 illuminates at a Near Infrared wavelength (also termed NIR wavelength).

In some embodiments, a NIR filter (not shown) is placed in the path of the light 226.

In some embodiments, a first NIR filter (not shown) is optionally placed in the path of the light 221, optionally passing NIR wavelength from the light source 211.

In some embodiments a second NIR filter (not shown) is optionally placed between the mirror 213 and the camera 216 in order to block non-NIR light, which does not come from the light source 211 through the first NIR filter.

In some embodiments the light source 211 illuminates at a spectrum of wavelengths, and a NIR filter (not shown) is placed in the path of the light 221, optionally passing NIR light through the NIR filter.

In some embodiments the image 201 is a CGH image. In some embodiments the CGH image is a three dimensional holographic display, optionally produced by coherent illumination of an interference pattern formed by a Spatial Light Modulator (SLM).

Figure 3:
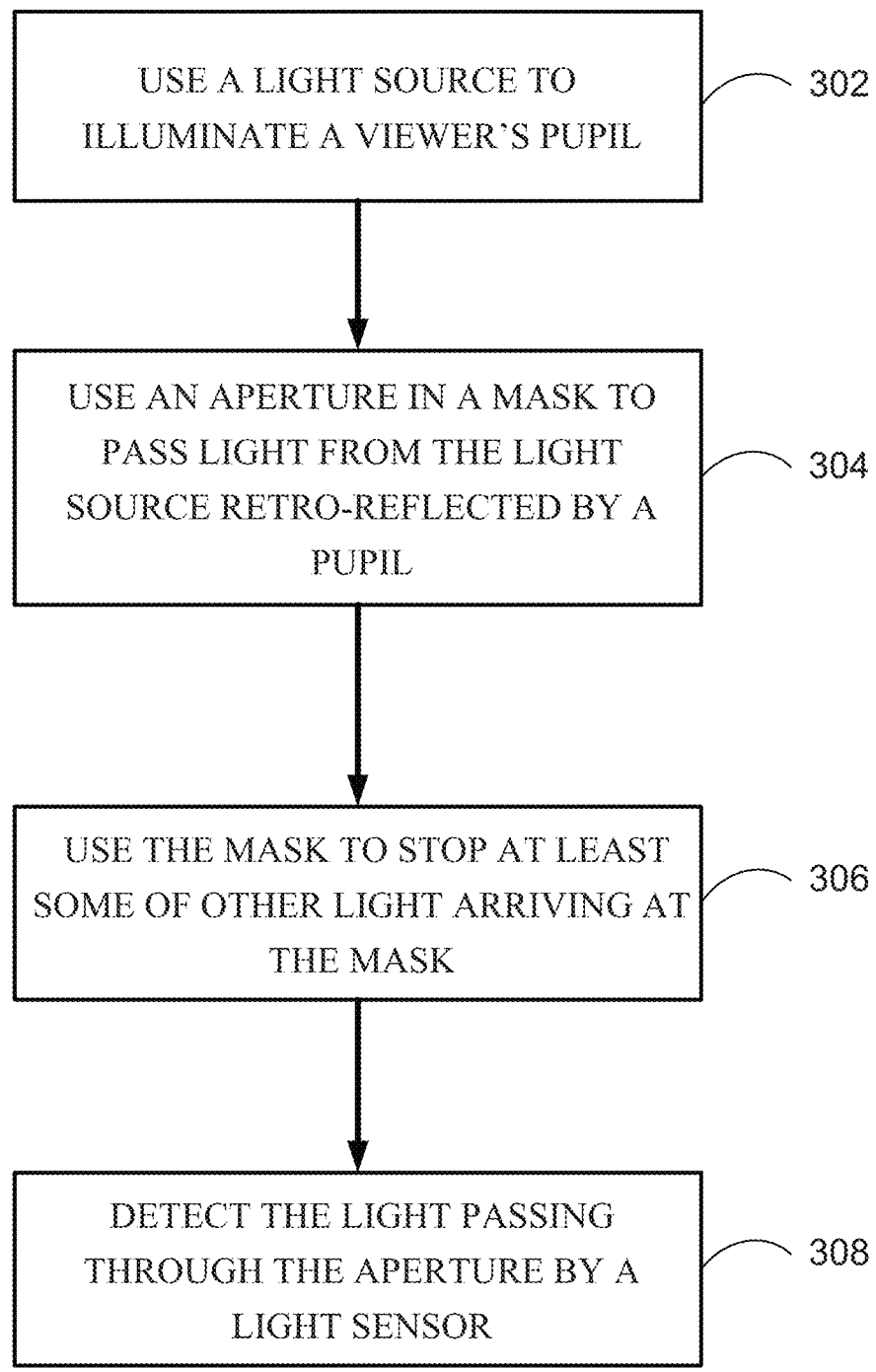
FIG. 3 is a simplified flow chart illustration of a method of tracking a viewer's pupil according to an example embodiment of the invention.

Reference is now made to FIG. 3, which is a simplified flow chart illustration of a method of tracking a viewer's pupil according to an example embodiment of the invention.

The method of FIG. 3 includes:

using a light source to illuminate a viewer's pupil (302);

using an aperture in a mask to pass light from the light source retro-reflected through the pupil (304);

using the mask to stop at least some of other light arriving at the mask (306);

detecting the light passing through the aperture by a light sensor (308).

In some embodiments the light source is used to illuminate an area of interest surrounding the viewer's eye.

In some embodiments the light sensor is optionally a beam positioning sensor for indicating a location of a beam center or a location of a center of a bright spot.

In some embodiments a quad detector is used for the detecting and locating of the location of the beam center or the location of the center of the bright spot.

Example Embodiments—Pupil Tracking in an Adjustable Arm Display and in a Head Mounted Display In some embodiments a display, such as a HMD, uses pupil tracking to ensure that an image is displayed on a viewer's pupil.

In some embodiments the HMD is a display, which displays images formed by a Spatial Light Modulator (SLM).

In some embodiments the HMD is a three dimensional holographic display, which displays holograms produced by coherent illumination of an interference pattern formed by a Spatial Light Modulator (SLM).

Figure 4B:
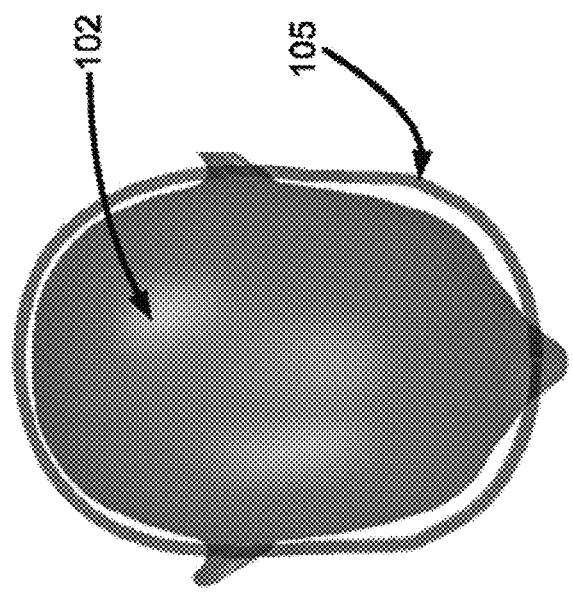
FIGS. 4A and 4B are two views of a head with a Head Mounted Display (HMD) according to an example embodiment of the invention.
Figure 4A:
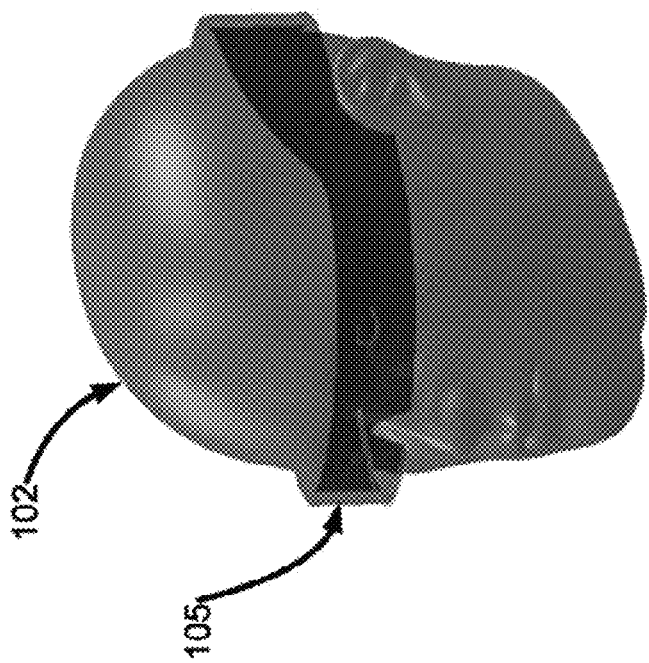

Reference is now made to FIGS. 4A and 4B, which are two views of a head 102 with a Head Mounted Display (HMD) 105 according to an example embodiment of the invention.

FIG. 4A depicts an isometric view and FIG. 4B depicts a top view.

FIGS. 4A and 4B depict an example embodiment of a HMD worn similarly to eyeglasses or goggles.

In some embodiments, the HMD 105 displays a virtual reality display. Some embodiments implement what is commonly called a virtual reality display.

In some embodiments, the HMD 105 allows a viewer to see through the glasses while also displaying a holographic image. Such embodiments implement what is commonly called an augmented reality display.

Figure 4C:
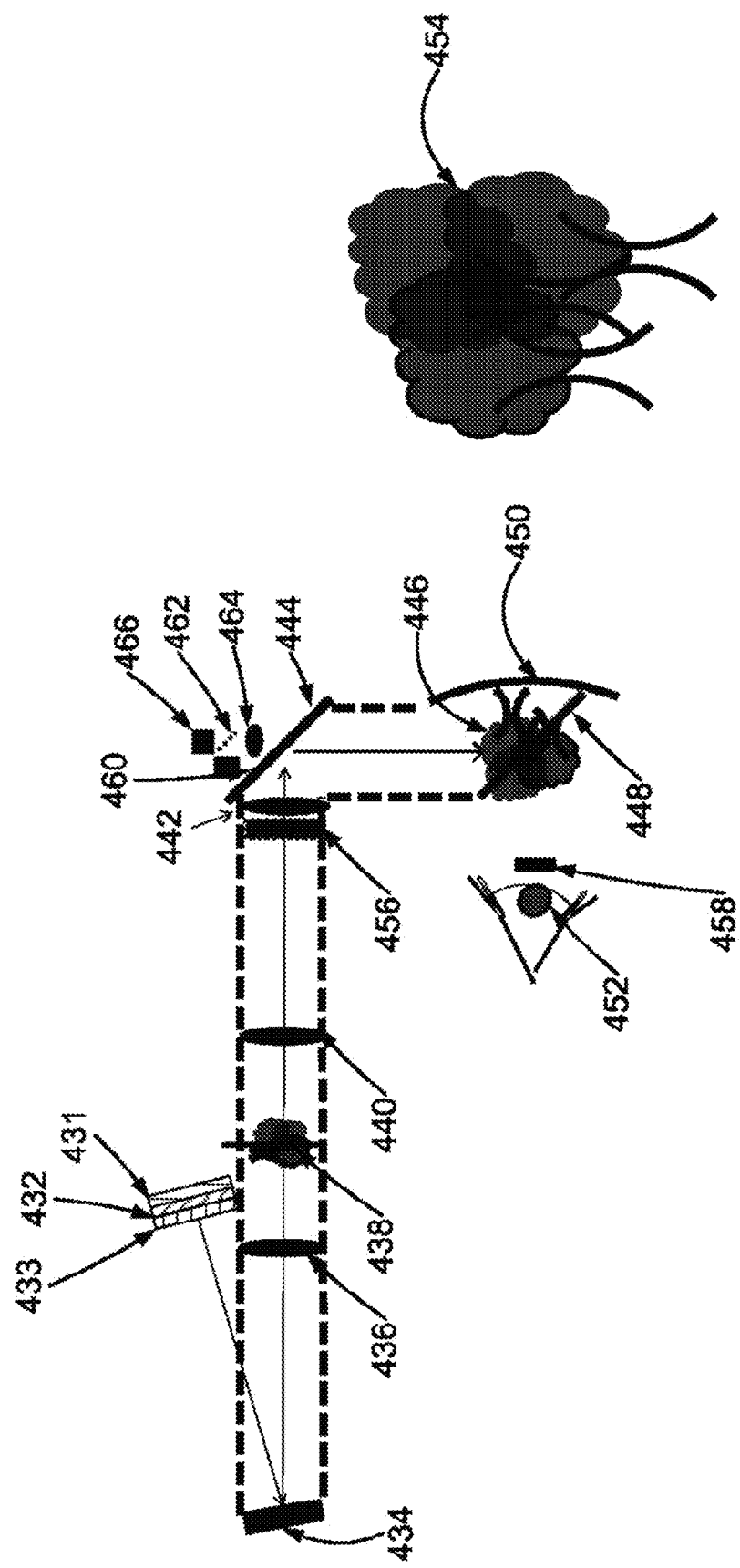
FIG. 4C is a simplified illustration of an optical system in a HMD according to an example embodiment of the invention.

Reference is now made to FIG. 4C, which is a simplified illustration of an optional optical system in a HMD according to an example embodiment of the invention.

FIG. 4C depicts an example embodiment showing how a three-color Computer Generated Holographic (CGH) image may be produced. In some embodiments the CGH image is an interference pattern based holographic image. In some embodiments the CGH image is a fringe pattern based holographic image.

FIG. 4C depicts an optical path starting at three sources of coherent light at three colors: a red source 431; a green source 432; and a blue source 433. The three sources of coherent light 431 432 433 illuminate an SLM 434 at an angle, and the light is reflected toward a first lens 436. A first, optionally three-colored, CGH image 438 is formed after the first lens 436. In some embodiments, the SLM may optionally be a transmissive SLM (not shown in FIG. 4C).

Light continues to propagate, through a second lens 440, and optionally forming an image 456 of the SLM at a vicinity of a third lens 442, and continues to propagate off a diagonal mirror 444, and produce a CGH image 446. The CGH image 446 is optionally located at a location of a second diagonal mirror 448.

In some embodiments, the second lens 440 is selected to produce Fourier holographic image as the second CGH image 446.

In some embodiments, the second diagonal mirror 448 is a partially-reflecting/partially-transmitting mirror.

Light continues to propagate, so the CGH image 446 is re-imaged by reflection off the partially-reflective second diagonal mirror 448 onto a trichroic RGB (Red-Green-Blue) curved reflector 450 which optionally at-least-partially reflects at the three red-green-blue source wavelengths and is transparent at other wavelengths. The light continues through the partially-transmissive second diagonal mirror 448 onto a viewer's pupil 452. The viewer sees an apparent CGH image 454 floating directly ahead, in the direction of the trichroic RGB curved reflector 450.

In some embodiments, the three coherent light sources 431 432 433 are optionally operated sequentially, one at a time, and the SLM 434 is set to pixel values corresponding to each one of the three colors separately.

In some embodiments a rate of cycling through the three colors is optionally 5 full cycles (three colors) per second, 8 full cycles per second (cps), 15 cps, 20 cps, 24 cps, 25 cps, 30 cps, 50 cps, 60 cps, 100 cps and greater.

In some embodiments, the viewer also sees a view of the real-world (not shown in FIG. 4C) straight through the partially-transmissive second diagonal mirror 448 and the trichroic RGB curved reflector 450, since the above-mentioned optical elements are partially-transmissive and transmissive at most wavelengths respectively.

In some embodiments, the optical elements along the path from the SLM 434 to the pupil 452 also produce a first image 456 of the SLM 434 following the second lens 440, and a second image 458 of the SLM 434 is produced by re-imaging the first image 456 of the SLM 434 by optical components in the optical path, such as the curved reflector 450. The second image 458 of the SLM 434 is produced adjacent to or even right on the viewer's pupil 452, even if it does not appear so in FIG. 4C, for the sake of clarity. Optionally the second image 458 is at a vicinity of the viewer's pupil 452. Optionally the lens 442 is imaged to the viewer's pupil 452. It is noted that the second image 458 of the SLM 434 forms an observing window for the viewer's pupil 452.

In some embodiments, an adjustable optical component is placed at a location of the image 456 of the SLM 434 in order to adjust for changes in orientation of the optical system, which may be moved by its user, relative to a desired position for the second virtual CGH image 458.

FIG. 4C also depicts components of the HMD used for tracking a location of a viewer's pupil in conjunction with some of the components used for displaying a CGH image.

FIG. 4C depicts a light source 460 for illuminating the viewer's pupil 452, a partially-reflecting/partially-transmitting mirror 462, a lens 464, and a light reception component 466 (a sensor or camera). Optionally the mirror 444 is at least partially transparent at the wavelength of the light source 460. The curved trichroic RGB reflector 450 is also reflective at the wavelength of the light source 460. Optionally the reflector 450 is reflective at the wavelength of the light source 460, optionally at Near-Infra-Red wavelength.

In some embodiments, the light source 460 produces Near Infra-Red (Near-IR, or NIR) light. In some embodiments the light reception component 466 (sensor or camera) is designed to detect NIR.

Light from the light source 460 is optionally projected onto the partially-reflecting/partially-transmitting mirror 462; reflected from the partially-reflecting/partially-transmitting mirror 462, through the lens 464, through the mirror 444 onto the second diagonal mirror 448, to the trichroic (red-green-blue) RGB and Near-IR reflector 450; reflected back from the trichroic (red-green-blue) RGB and Near-IR reflector 450 through the second diagonal mirror 448 towards the viewer's eye area approximately at the pupil 452.

In some embodiments, an area in the vicinity of the eye is illuminated and imaged by the Near-IR tracking system. Optionally, the area is between approximately 1, 2, 5, 10, 100, 500, 1,000 and 2,500 square millimeters and even 10,000 square millimeters and more.

Light reflected from the viewer's eye or pupil 452 passes through the second diagonal mirror 448; to the trichroic (red-green-blue) RGB and Near-IR reflector 450, which also reflects wavelengths of the light source 460; is reflected back from the trichroic (red-green-blue) RGB and Near-IR reflector 450 onto the second diagonal mirror 448; reflected from the second diagonal mirror 448 to the mirror 444; passes through the mirror 444, through the lens 464, through the partially-reflecting/partially-transmitting mirror 462, onto the light reception component 466. A path of the light reflected from the viewer's eye or pupil 452 is described in the above text, but not drawn in FIG. 4C, so as not to complicate the drawing.

Non-limiting examples of embodiments contemplated for the light reception components 466 include a camera and a quadrant detector.

In some embodiments, the light reception component 466 is a camera, and a location of the pupil is obtained by image processing, by detecting the pupil.

In some embodiments, calculating a viewing portion of a CGH image may optionally be done by monitoring, in a viewer's eye or eyes, pupil location with respect to the eye ball.

In some embodiments, calculating an eye gaze direction may optionally be done by monitoring pupil location relative to a viewer's eye.

In some embodiments, an observation direction is optionally calculated by triangulation to determine a location of the portion of a CGH image which is observed. A reference to such a method may be found in above-mentioned article titled "Measuring Gaze Depth with an Eye Tracker During Stereoscopic Display" by Andrew T. Duchowski, Brandon Pelfrey, Donald H. House, and Rui Wang.

In some embodiments tracking a viewer's pupil is used for determining control signals to adjust an image so that the image appears static in space.

In some embodiments tracking a viewer's pupil is used for determining what part of a CGH image will be with high resolution (i.e. on a direct optical axis) while the rest of the image may potentially be calculated and projected at a lower resolution.

In some embodiments, when a viewer moves a pupil relative to the HMD, an optical component is optionally used to move an image of the SLM to remain at the viewer's pupil.

In some embodiments, when a viewer moves an eye relative to the HMD, an optical component is optionally used to move an image of the SLM to remain at the viewer's gaze direction.

In some embodiments, when a mirror or some other direction-shifting component in the optical system is used to shift a direction or a location of the image of the SLM, pixel values of the SLM are optionally re-calculated to produce a CGH image corrected for the shift.

In some embodiments, if a viewer's gaze direction moves within an observing window (image of the SLM), no re-calculation is used.

In some embodiments a shift in pupil location is used to redirect an image of the CGH in front of the pupil, and/or to re-calculate SLM values to produce the CGH according to a new observing direction.

Figure 4D:
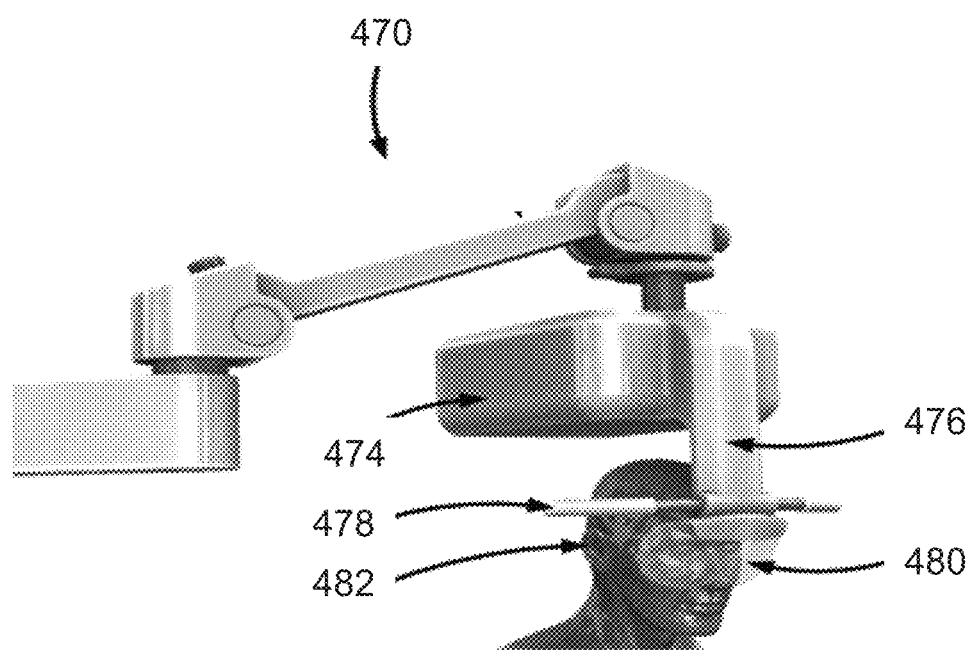
FIG. 4D is a simplified illustration of an example embodiment of a display on an adjustable arm according to an example embodiment of the invention.

Reference is now made to FIG. 4D, which is a simplified illustration of an example embodiment of a display on an adjustable arm according to an example embodiment of the invention.

FIG. 4D shows an isometric view of an adjustable arm mounted display 470, by way of a non-limiting example such as described in above-mentioned PCT Patent Application No. IL2017/050226. The display 470 optionally includes pupil-tracking components such as described elsewhere herein.

In some embodiments, the display 470 is a virtual reality display. In some embodiments the display 470 implements what is commonly called a virtual reality display.

In some embodiments, the display 470 allows a viewer to see through a screen while also displaying a holographic image. In some embodiments the display 470 implements what is commonly called an augmented reality display.

FIG. 4D shows a display 470 which includes an optional enclosure 474 large enough to optionally include a computing unit (not shown, but may be within the enclosure 474); as well as optical components such as coherent light sources, SLM(s), and optionally additional components.

FIG. 4D shows an optional arm 476 from the enclosure 474 to a display screen 480, potentially containing optical components as described elsewhere herein. In some embodiments, the display screen 480 is a mirror, a partially transmitting/partially reflecting mirror, or a volumetric optical component, as described elsewhere herein. In some embodiments, the display screen 480 is segmented into two or more display screens. In some embodiments, the display screen 480 is segmented into two display screens, one for each eye. In some embodiments, the two display screens are mounted at different angles. In some embodiments, the location and orientation of the two display screens is configurable.

FIG. 4D also shows one or more optional handle(s) 478.

FIG. 4D also shows a viewer 482 using the display 470.

Now that example embodiments of an arm-mounted display and a HMD have been described with reference to pupil tracking, additional detail is provided with reference to additional embodiments of pupil tracking.

Figure 5:
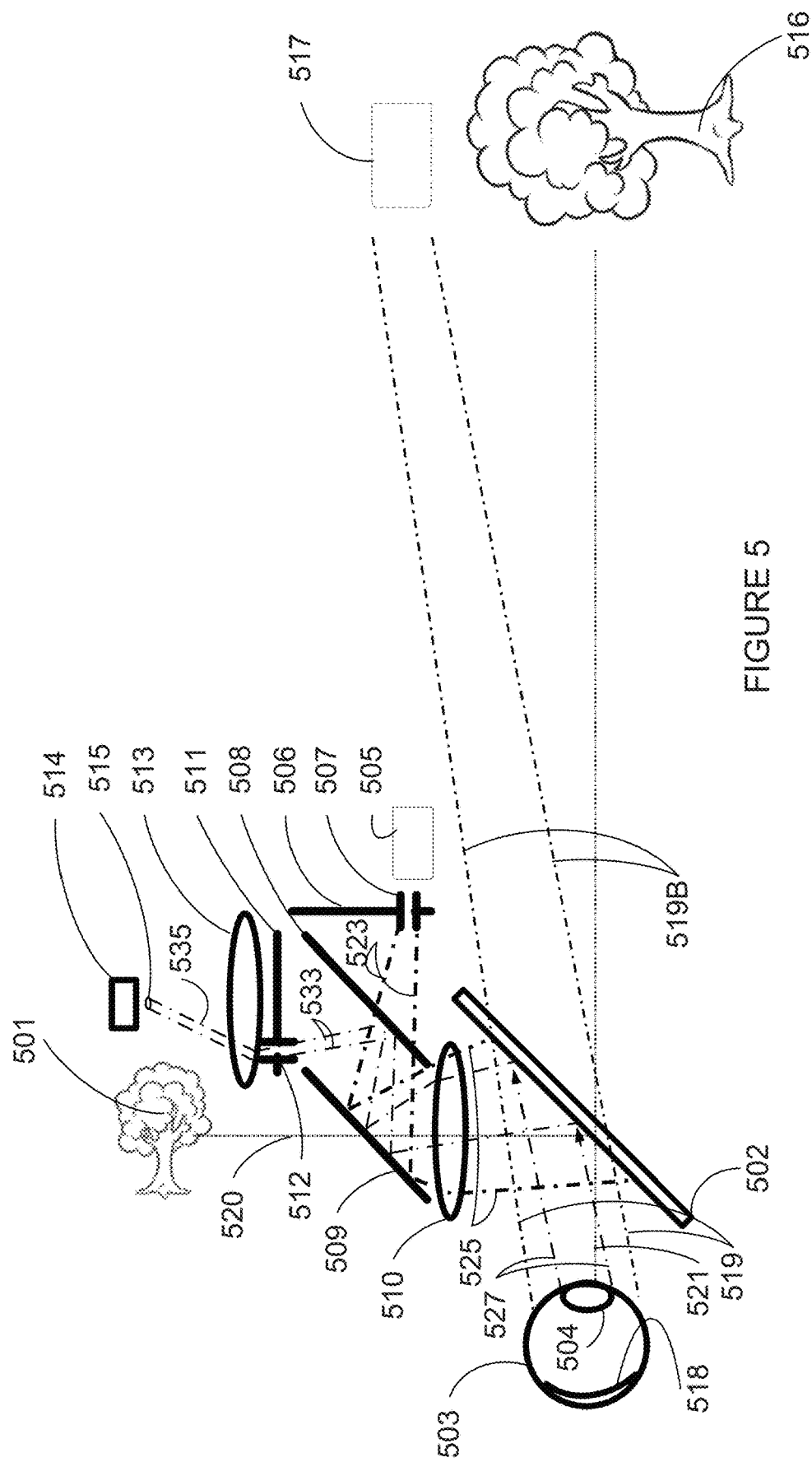
FIG. 5 is a simplified line drawing of a viewer's eye, image display components and pupil tracking components according to an example embodiment of the invention.

Reference is now made to FIG. 5, which is a simplified line drawing of a viewer's eye, image display components and pupil tracking components according to an example embodiment of the invention.

FIG. 5 shows some optical components for displaying an image 501 to a viewer's eye 503. Light 520 for producing the image 501 is projected through a semi-transmitting semi-reflecting mirror 509, toward an optionally semi-transmitting semi-reflecting mirror 502, and reflected from the mirror 502 in a direction 521 onto the viewer's eye 503. Light (not shown) passes through a pupil 504 of the viewer's eye 503, and forms the image 501 on the viewer's retina 518. A viewer sees the image 501 coming from the direction 521 of the mirror 502, so the image 501 appears to the viewer to be at a location of the image 516.

FIG. 5 also shows some optical components for pupil tracking. A light source 505 projects light 523 through a semi-transmitting semi-reflecting mirror 508, continues as light 523, to be reflected by the semi-transmitting semi-reflecting mirror 509 as light 525, in a similar direction as the light 520. In some embodiments, the light source 505 projects light through an aperture 507 in a mask 506 which blocks light from passing except through the aperture 507.

The light 525 is reflected from the mirror 502 as light 519, in the direction 521 onto the viewer's eye 503, similarly to the light for producing the apparent image 516. A portion of the light 519 from the light source 505 passes through the pupil 504, falls onto the retina 518, and is retro-reflected back from the retina, through the pupil 504, as light 527. At least some of the light 527 is reflected from the mirror 502, and at least some of that light is reflected from the semi-transmitting semi-reflecting mirror 509, toward the semi-transmitting semi-reflecting mirror 508. At least some of the light which reaches the semi-transmitting semi-reflecting mirror 508 is reflected from the semi-transmitting semi-reflecting mirror 508 as light 533 toward an aperture 512.

In some embodiments a periscope (not shown) is optionally placed at or next to a plane of the mask 511, to channel the light 533 closer to the optical axis. The periscope is optionally used to change the location of the aperture 512 to be closer to the optical axis, which potentially reduces a size of the lens 513 and detector 514, potentially reducing a size and/or cost of the optical system.

In some embodiments, the aperture 512 is formed in a mask 511 which blocks light from passing except through the aperture 512. In some embodiments the location of the aperture 512 is optionally at a location of an image of the aperture 507, imaged by a lens 510.

In some embodiments the optical components included in the path of the light from the light source 505 to the aperture 512 are optionally designed to image the light source 505, or the aperture 507, at a plane of the mask 511. In such embodiments the light reflected from the retina 518 through the pupil 504 passes through an area of an image of the light source 505, or the aperture 507, at the aperture 512. In such embodiments the aperture 512 is sized and shaped to let through light 533 which reflected back from the retina 518 through the pupil 504, and the mask 511 to block light not passing through the aperture 512. The light not passing through the aperture 512 includes light scattered from the white of the viewer's eye 503, light reflected from various surfaces of optical components, light possible reflected from the viewer's eyeglasses (if any), and light which is used to display the image 516.

In some embodiments, light 535 which passes through the aperture 512 and a lens 513 reaches a sensor or camera 514, forming an image or bright spot 515 of the pupil 504 on the camera 514 at a location which corresponds to a location of the pupil 504 relative to the light 519 from the light source 505. In some embodiments the camera 514 is not a camera but a sensor such as, by way of a non-limiting example, a beam position sensor placed at the vicinity of an image plane of the pupil 504. The camera 514 or sensor optionally tracks the image or bright spot 515, and a computing unit (not shown in FIG. 5) optionally tracks movement of the pupil 504.

In some embodiments the lens 510 is used to image the image 501 to a location 516 apparently in front of the viewer's eye 503.

In some embodiments the lens 513 is not included and the retro-reflected light 533 that passes through aperture 512 directly illuminates the camera 514 or sensor.

In some embodiments the tracking includes computing coordinates of the location of the pupil 504, optionally relative to coordinates of a component of the system shown in FIG. 5. In some embodiments the tracking includes computing a change in coordinates of the location of the pupil 504, optionally relative to some start position of the pupil 504.

In some embodiments the tracking includes computing a direction of the pupil relative to a component of the system shown in FIG. 5. In some embodiments the tracking includes computing a change in direction of a gaze of the pupil 504 optionally relative to some start direction of the gaze of the pupil 504.

In some embodiments, the optical system of FIG. 5 is designed so that the light 523 from the light source 505 forms an image 517 at a location along lines 519B, which are continuations of the direction of the lines 519, apparently aside or above or below of the image 516.

In some embodiments, the light 535 passes through an optional optical component such as a lens 513, to focus the image or bright spot 515. In such embodiments the bright spot is potentially smaller and more intense, potentially increasing a Signal to Noise Ratio of a signal from the bright spot relative to a signal from a background of the image or bright spot 515.

In some embodiments the lens 513 images the pupil 504 on the camera 514 or sensor.

In some embodiments, the light for displaying the image 501 and the light from the light source 505 pass through an optional optical component such as a lens 510.

In some embodiments, optical elements along a path from an SLM (not shown) for producing the image 501 to the pupil 504 also produce an image of the SLM (not shown, similar to the image of the SLM 458 in FIG. 4C) adjacent to or even right on the viewer's pupil 504. It is noted that the image of the SLM optionally forms an observing window for the viewer's pupil 504.

In some embodiments the mirror 502 is a fully-reflecting mirror, enabling the eye 503 to see the image 516 reflected from the mirror 502 but not a view of the real world through the mirror 502. In some embodiments such display is termed a virtual reality display.

In some embodiments the mirror 502 is a semi-reflecting semi-transmissive mirror, enabling the eye 503 to see the image 516 reflected from the mirror 502 as well as a view of the real world through the semi-reflecting semi-transmissive mirror 502. In some embodiments such a combination of the real world and a computer generated image 516 is termed an augmented reality display.

In some embodiments, by way of a non-limiting example in a HMD configuration, the mirror 502 acts as a beam combiner that allows seeing a view of the real world while also observing an image overlaid on the real world view.

An optional lens such as the lens 510, optionally placed in the optic path of the display system before the beam combiner mirror 502, images the CGH image 501 to appear to be in front of the viewer's eye 503.

In some embodiments an optical axis of a pupil tracking system is combined with the CGH imaging system using beam splitters or semi-transparent semi-transmissive mirrors.

In some embodiments the pupil tracking system optionally includes a near-IR LED (light emitting device) such as the light source 505, an optional aperture at a vicinity of the near-IR LED (NIR LED) such as the aperture 507, one or more beam-splitters, an aperture stop at a vicinity of an imaging lens such as the aperture 512, and a light sensing element such as a CCD or a CCD camera such as the camera 514.

In some embodiments the light source 505, or its image, is at a similar optical path length from a viewer's eye 503 as the CGH image 501 distance.

In some embodiments the light source 505 is located at a side of a Field of View (FoV) of the eye 503, so that a negligible-intensity visible image 517 of the NIR LED appears at a side of the image 516.

In some embodiments the light source 505 illuminates an entire pupil 504, between dashed lines 519, where the viewer's eye is located, or even a greater area, by way of a non-limiting example an area of a size of 50×50 millimeters. In some embodiments the area is of a size of a range of approximately 3×3 millimeters to 100×100 millimeters, as well as non-square area shapes.

In some embodiments the two lenses 510 513 image the pupil 504 to the sensor 514, such as a CCD camera 514, of the pupil tracking unit. Near-IR radiation is retro-reflected from the viewer's pupil 504 (see lines 527 533 535) is imaged back to CCD camera 514, at a position of the image or bright spot 515 corresponding to a position of the pupil 504. The mask 511 and the aperture 512 block radiation except at a location corresponding to a retro-reflection of the light source 505 illumination. Retro-reflected light from the pupil 504, after reflection from the semi-transmitting semi-reflecting mirror 508, passes the aperture 512 and forms an image or bright spot 515 of the pupil 504 at the CCD camera 514 plane. Other scattered light does not pass the aperture 512, thus considerably increasing SNR of the image or bright spot 515 to its background.

In some embodiments the light source 505 illumination is inside the FoV of the viewer's eye, and the illumination enables retro-reflected light to reach the tracking unit sensor 514 or camera 514.

In some embodiments optical components of the image display components and pupil tracking components form an image 517 of the light source 505 illumination outside the image 516, so the an image 517 does not potentially interfere with a quality of the image 516.

In some embodiments off axis reflections from the eye 503 and/or a viewer's glasses (not shown in FIG. 5) do not pass through the aperture 512 and do not arrive at the camera 514, thereby improving the SNR of the image or bright spot 515.

In some embodiments an optional polarizing filter (not shown) is placed after the light source 505, illuminating the pupil 504 with polarized light.

In some embodiments a cross-polarized filter, cross-polarized with respect to the above-mentioned optional polarizing filter, is placed in the optical path before the camera or sensor 514. Because the eye 503 scrambles polarization, a portion of the reflected light 527 533 535 reaches the sensor 514. In contrast, reflections from optical surfaces maintain polarization, and are blocked by the cross-polarized filter. Such a use of the cross-polarized filter potentially further improves SNR.

Reference is now made to FIG. 6, which is a simplified line drawing illustration of components for tracking a pupil according to an example embodiment of the invention.

FIG. 6 shows components which participate in tracking a viewer's pupil (not shown).

FIG. 6 shows a light source 602 projecting light 604, optionally through an illumination aperture 612 in an optional first, illumination-side, mask 621, to a semi-transparent semi-reflecting mirror 603, emerging from the semi-transparent semi reflecting mirror 603 as light 605.

Light 606 reflected from a viewer's direction goes toward the semi-transparent semi reflecting mirror 603, and is retro-reflected from a viewer's pupil and scattered from the viewer's face (the viewer's eye and/or face are not shown in FIG. 6) as light 607 toward a mask 619. The mask 619 includes an aperture 622.

In some embodiments the mask 619 is at a plane of an aperture stop of the pupil tracking optical components.

In some embodiments the mask 619 is at a plane where an image of the light source 602 or an image of the optional aperture 612 in the first mask 621 are in focus.

The aperture 622 is at a location where retro-reflected light from the light source 602 or from the optional aperture 612 fall on the mask 619.

The aperture 622 passes light 607, which is an image of the light source 602, and the mask 619 blocks the rest of the light, which corresponds to at least a portion of light scattered by the viewer face and eyes, and light scattered by possible additional light scatterers such as a viewer's glasses or various optical components of the image display system or even the pupil tracking components.

The light 608 forms a spot 609 on a sensor or camera 611. A location of the spot 609 corresponds to a location of the viewer's pupil (not shown in FIG. 6).

In some embodiments the light 608 passes through an optional optical component such as a lens 615. In some embodiments the lens 615 forms an image of the viewer's pupil on the sensor or camera 611.

In some embodiments the aperture 612 includes a polarizer that polarizes the light 604.

In some embodiments the aperture 622 includes a polarizer.

In some embodiments the pupil tracking components include a first polarizer that polarizes the light 604, such as at or near the aperture 612, and an optional second polarizer for filtering retro-reflected light, the second polarizer optionally located at the aperture 622, the second polarizer optionally polarized at perpendicular polarization to that of the first polarizer.

Typically, light 606 607 retro-reflected from a retina does not keep its polarization. Thus, at least some of the retro-reflected light 606 607 will pass the polarizer at the aperture 622. Light reflected from optical surfaces in the pupil-tracking and/or display system which do not change polarization will optionally be blocked by the polarizer at the aperture 622.

Example Embodiments—Multiple Light Sources and/or Multiple Apertures

FIG. 6 was described above, and a relationship was described between a location of the light source 602 or the optional aperture 612 in the optional mask 621 and a location of the aperture 622 in the mask 619.

In some embodiments, the light source 602 spans an area, and there are more than one aperture(s) such as the aperture 612 in the mask 621, which provide more than one source(s) of light for illuminating the viewer and tracking the viewer's pupil.

In some embodiments there are more than one aperture(s) such as the aperture 622 in the mask 619, which provide more than one opening for passing light 608 through the mask 619.

In some embodiments the multiple apertures in the mask 619 are located at locations corresponding to locations where images of apertures 612 in the mask 621 are formed on the mask 619.

In some embodiments the multiple apertures in the mask 619 are located at locations where images corresponding to locations of multiple light sources 602 are formed on the mask 619.

Reference is now made to FIGS. 7A-7F, which are simplified illustrations of locations of images of pupil tracking illumination light sources and simplified illustrations of locations of apertures corresponding to the images of the pupil tracking illumination light according to example embodiments of the invention.

FIG. 7A shows a location of an image 702 of a pupil tracking illumination light source (such as the light source 602 of FIG. 6), or a location of an image of an illumination aperture (such as the aperture 612 of FIG. 6), as viewed by a viewer of an image display system, with respect to a location of an image 701 displayed by the display system.

FIG. 7B shows a mask 703 with an aperture 704, a location of the aperture 704 in the mask 703 corresponding to a location of an image of the illumination light source on the mask 703. FIG. 7B shows an aperture 704 corresponding to the aperture 622 of FIG. 6, and a mask 703 corresponding to the mask 619 of FIG. 6.

FIG. 7B shows the aperture 704 at a location displaced relative to the mask 703 in a same direction as the image 702 of the light source is displaced relative to the image 701. In some embodiments the displacement is not necessarily in the same direction.

In some embodiments a direction of displacement of the image 702 relative to the image 701 may be any direction, as long as the image 702 does not overlap the image 701.

In some embodiments the image 702 may even overlap the image 701. In some embodiments the illumination light source uses a wavelength not visible to a human viewer, such as a NIR light source.

In some embodiments a displacement of the aperture 704 relative to the mask 703 may be any displacement, as long as the aperture 704 is at a location where an image of a pupil-tracking light source is imaged on the mask 703.

FIG. 7C shows a case of an image 706 displayed by a display system. The display system optionally uses pupil tracking components to track multiple images 707a 707b 707c of multiple pupil tracking illumination lights, the images 707a 707b 707c at locations around the image 706, to track a viewer's pupil (the viewer's pupil and eye are not shown in FIG. 7C). In some embodiments a location of the mask 703 relative to the pupil tracking components optionally corresponds to the location of the mask 619 of FIG. 6.

FIG. 7D shows a mask 708, with apertures 709a 709b 709c. The apertures 709a 709b 709c are located in the mask 708 at locations corresponding to locations of the images 707a 707b 707c as imaged on the mask 708. In some embodiments a location of the mask 708 relative to the pupil tracking components optionally corresponds to the location of the mask 619 of FIG. 6.

FIG. 7D shows the apertures 709a 709b 709c at locations displaced relative to the mask 708 in similar directions as the images 707a 707b 707c are displaced relative to the image 706. In some embodiments the displacements are not necessarily in similar directions.

In some embodiments directions of displacement of the images 707a 707b 707c relative to the image 706 may be any direction, as long as the images 707a 707b 707c do not overlap the image 706, or at least some of the images 707a 707b 707c do not overlap the image 706.

In some embodiments displacements of the apertures 709a 709b 709c relative to the mask 708 may be any displacement, as long as the apertures 709a 709b 709c are at locations where corresponding images 707a 707b 707c are imaged on the mask 708.

In some embodiments locations of the light sources for producing the images 707a 707b 707c are asymmetric with respect to an optical axis of the pupil tracking components, so that reflection from a first light source will not reach an aperture corresponding to another, second, light source, and so will not pass the aperture.

FIG. 7E shows a case of an image 711 displayed by a display system. The display system optionally uses one or more pupil tracking component(s) to track multiple images 712a 712b 712c 712d 712e 712f of pupil tracking illumination light, the images 712a 712b 712c 712d 712e 712f at locations around the image 711, to track a viewer's pupil (the viewer's pupil and eye are not shown in FIG. 7E).

FIG. 7F shows a mask 713, with apertures 714a 714b 714c 714d 714e 714f. The apertures 714a 714b 714c 714d 714e 714f are located in the mask 713 at locations corresponding to locations of the images 712a 712b 712c 712d 712e 712f as imaged on the mask 713. In some embodiments a location of the mask 713 relative to the pupil tracking components optionally corresponds to the location of the mask 619 of FIG. 6.

In some embodiments, an actual pupil tracking illumination light source is placed at the location of the images 702 707a 707b 707c 712a 712b 712c 712d 712e 712f. In description of FIGS. 7A-7F it should be understood that wherever an image of a light source, or an aperture of a light source are described, the descriptions also apply to actual light source(s) placed at a location of the image(s).

In some embodiments, locations of each one of the plurality of apertures, such as the plurality of apertures 709a 709b 709c of FIG. 7D or the plurality of apertures 714a 714b 714c 714d 714e 714f of FIG. 7F is located so as not to receive retro-reflected light from a different one of the plurality of light sources.

In some embodiments one illumination source and optionally a diffuser, optionally provide light that passes through the multi aperture masks 708 713.

In some embodiments, some or all of the light sources emit light at different wavelength spectrums, an optionally the aperture masks corresponding to each light sources have matching spectral filters passing only wavelengths corresponding to their light source.

In some embodiments the pupil tracking light sources are turned on and off, optionally sequentially, potentially reducing total light used for pupil tracking.

In some embodiments, the pupil tracking light sources are turned on and off, optionally synchronized with corresponding apertures opening and closing. Such embodiments potentially reduce stray light from open apertures. In some embodiments the apertures have open and closed states based on mechanical shutters; electronic shutters such as Liquid Crystal (LC) based shutters, and/or other types of shutters.

In some embodiments a chopper is optionally placed to chop light from a pupil tracking light source. In some embodiments a corresponding chopper is optionally placed and synchronized with the light source chopper to chop light received at a camera or sensor for tracking the pupil.

In some embodiments a polarizer is placed to polarize a pupil tracking light source, and optionally a perpendicular polarizer is placed at a sensor-side mask such as the mask 619 of FIG. 6, to block reflection from optical surfaces such as glasses and inner reflections.

It is expected that during the life of a patent maturing from this application many relevant display systems will be developed and the scope of the term display system is intended to include all such new technologies a priori.

It is expected that during the life of a patent maturing from this application many relevant pupil-tracking light sources will be developed and the scope of the term pupil-tracking light source is intended to include all such new technologies a priori.

As used herein the term "about" refers to ±10%.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A pupil tracking system comprising:
  a plurality of light sources for illuminating a pupil of a viewer;
  a plurality of first apertures in a first mask, each one of the plurality of the first apertures located along a same direction from the pupil of the viewer as a direction of a corresponding one of the plurality of light sources, to pass retro-reflected light from the plurality of light sources after the light is retro-reflected from a retina of the viewer through the pupil of the viewer, the first apertures sized and shaped to pass the light from the plurality of light sources and block at least a portion of other light arriving at the first apertures;

a light sensor; and an optical component which produces a spot of retro-reflected light from the pupil of the viewer on the light sensor, such that tracking movement the spot produced by the retro-reflected light which passed through the pupil of the viewer on the light sensor corresponds to tracking movement of the pupil of the viewer.

2. The system of claim 1, in which locations of each one of the plurality of first apertures is located so as not to receive retro-reflected light from a non-corresponding one of the plurality of light sources.

3. The system of claim 1, in which:

the plurality of light sources for illuminating the pupil of the viewer are provided by using one first light source and a second mask comprising a plurality of second apertures for passing light emerging from the one first light source through the plurality of second apertures, thereby providing a plurality of light sources corresponding to the plurality of apertures in the second mask.

4. The system of claim 1, wherein the optical component for imaging the pupil of the viewer on the light sensor is placed next to the plurality of first apertures.

5. The system of claim 1 comprised in a Head Mounted Display (HMD) and further comprising a computer generated image display system for displaying a computer generated image to an eye of the viewer.

6. The system of claim 5, wherein the computer generated image display system is a system for displaying a three dimensional (3D) computer generated holographic (CGH) image to the eye of the viewer.

7. The system of claim 5, in which light from the plurality of light sources forms a plurality of apparent images, relative to the computer generated image, which do not overlap the computer generated image.

8. The system of claim 1, in which at least a first one of the plurality of light sources emits light at a different spectrum than at least a second one of the plurality of light sources.

9. The system of claim 8 and further comprising at least one of the first aperture passing light from a first light source and a second aperture passing light from a second light source comprises a spectral filter to pass only light from a corresponding one of the first light source and the second light source.

10. The system of claim 1, wherein the plurality of light sources provide plane-polarized light and further comprising:

a retro-reflected-light plane-polarizing filter located along an optical path after retro-reflection from the pupil of the viewer, polarized at a polarization direction perpendicular to that of a direction of polarization of the plane-polarized light provided by the plurality of light sources.

11. The system of claim 1 wherein each one of the plurality of first apertures is located at an image of a corresponding one of the plurality of light sources.

12. A method for tracking a pupil of a viewer comprising:

using a plurality of light sources to illuminate a pupil of a viewer;

collecting retro-reflected light returning from a retina of the viewer through the pupil of the viewer at a direction opposite to a direction the retro-reflected light entered through the pupil of the viewer;

using a plurality of first apertures in a first mask, each one of the plurality of the first apertures located along a same direction from the pupil of the viewer as a direction of a corresponding one of the plurality of light sources, to pass the retro-reflected light from the pupil of the viewer;

using the first mask to stop at least some of other light arriving at the first mask;

using an optical element to produce a spot of the retro-reflected light from the pupil of the viewer on a light sensor; and determining locations of the spots by the light sensor, and further comprising locating the plurality of first apertures each along a same direction from the viewer's pupil as a corresponding direction of the plurality of light sources to the pupil, in the optical path after the retro-reflected light has been retro-reflected from the eye of the viewer through the pupil of the viewer.

13. The method of claim 12, in which the plurality of light sources are turned on in a time sequential fashion.

14. The method of claim 12, wherein tracking the pupil of the viewer comprises tracking the pupil of the viewer in a Head Mounted Display (HMD) for displaying a computer generated image.

15. The method of claim 14, wherein the computer generated image comprises a three dimensional (3D) computer generated holographic (CGH) image.

16. The method of claim 14, in which an optical path of the light from the plurality of light sources forms an apparent image, relative to the computer generated image, which does not overlap the computer generated image.

17. The method of claim 12, wherein:

the using the plurality of light sources to illuminate the pupil of the viewer comprises illuminating the pupil of the viewer pupil with plane-polarized light, and further comprising:

using a retro-reflected-light plane-polarizing filter located along an optical path after retro-reflection through the pupil of the viewer, polarized at a polarization direction perpendicular to that of a direction of polarization of the plane-polarized light provided by the plurality of light sources to filter light after retro-reflection through the viewer's pupil.

18. The method of claim 12 and further comprising using a plurality of second apertures in a second mask for passing light emerging from the plurality of light sources before illuminating the eye of the viewer, and locating the plurality of second apertures next to a corresponding one of the plurality of light sources.

19. The method of claim 12, in which locations of each one of the plurality of first apertures is located so as not to receive retro-reflected light from a non-corresponding one of the plurality of light sources.

20. The method of claim 12, wherein the optical element to produce the image of the pupil of the viewer on the light sensor is placed next to the plurality of first apertures.

21. The method of claim 12, in which at least a first one of the plurality of light sources emits light at a different spectrum than at least a second one of the plurality of light sources.

22. The method of claim 21 in which at least one of a first aperture passing light from the first one of the plurality of light sources and a second aperture passing light from the second one of the plurality of light sources comprises a spectral filter to pass only light from a corresponding one of the first light source and the second light source.

23. The method of claim 12 wherein each one of the plurality of first apertures is located at an image of a corresponding one of the plurality of light sources.

24. The method of claim 12 wherein the plurality of light sources to illuminate the viewer's pupil are located so that the direction of light arriving from the plurality of light sources to the pupil is different from a direction of an image displayed to the viewer.

25. The method of claim 12 wherein the plurality of first apertures is located adjacent to the optical element used to produce the spot of the retro-reflected light on the light sensor.

26. A method for tracking a pupil of a viewer comprising:
using one light source and a first mask comprising a plurality of first apertures for passing light emerging from the one light source to illuminate a pupil of the viewer;
collecting retro-reflected light returning from a retina of the viewer through the pupil of the viewer at a direction opposite to a direction the light entered through the pupil of the viewer;
using a plurality of second apertures in a second mask, each one of the plurality of second apertures located to correspond to images of the plurality of first apertures to pass the retro-reflected light from the pupil of the viewer;
using the second mask to stop at least some of other light arriving at the second mask;
using an optical element to produce a spot of the retro-reflected light from the pupil on a light sensor; and
determining a location of the spot by the light sensor,
and further comprising locating the second apertures along a same direction from the pupil of the viewer as the direction of the first apertures to the pupil of the viewer, in the optical path after the retro-reflected light has been retro-reflected from the eye of the viewer through the pupil of the viewer.

* * * * *